US011795012B1

(12) United States Patent
Bacon et al.

(10) Patent No.: US 11,795,012 B1
(45) Date of Patent: Oct. 24, 2023

(54) MULTI-GRIPPER SYSTEM

(71) Applicants: Aaron Thomas Bacon, Garden Grove, CA (US); Aerick William Bacon, Garden Grove, CA (US); Thomas Dell Bacon, Garden Grove, CA (US)

(72) Inventors: Aaron Thomas Bacon, Garden Grove, CA (US); Aerick William Bacon, Garden Grove, CA (US); Thomas Dell Bacon, Garden Grove, CA (US)

(*) Notice: Subject to any disclaimer, the term of this patent is extended or adjusted under 35 U.S.C. 154(b) by 600 days.

(21) Appl. No.: 17/091,696

(22) Filed: Nov. 6, 2020

(51) Int. Cl.
*G06F 17/00* (2019.01)
*B65G 47/91* (2006.01)
*B25J 15/00* (2006.01)
*B25J 13/08* (2006.01)
*B25J 9/00* (2006.01)
*B25J 15/10* (2006.01)
*B25J 15/06* (2006.01)

(52) U.S. Cl.
CPC .......... *B65G 47/917* (2013.01); *B25J 9/0093* (2013.01); *B25J 13/088* (2013.01); *B25J 15/0052* (2013.01); *B65G 47/918* (2013.01); *B25J 15/0616* (2013.01); *B25J 15/106* (2013.01)

(58) Field of Classification Search
CPC .... B65G 47/917; B65G 47/918; B25J 9/0093; B25J 13/088; B25J 15/0052; B25J 15/0616; B25J 15/106

USPC ......................................................... 700/245
See application file for complete search history.

(56) References Cited

U.S. PATENT DOCUMENTS

| | | | |
|---|---|---|---|
| 8,855,818 B2 * | 10/2014 | Hashimoto .......... | B65G 47/918 700/250 |
| 9,346,169 B2 * | 5/2016 | Burns ..................... | B25J 9/0093 |
| 9,359,150 B2 * | 6/2016 | Jodoin ................... | B65G 47/90 |
| 10,168,686 B2 * | 1/2019 | Choi ..................... | B62D 65/024 |
| 10,618,181 B2 * | 4/2020 | Aiso ................ | G05B 19/41845 |
| 10,639,790 B1 | 5/2020 | Bacon et al. .......... | B25J 9/1612 |
| 10,906,182 B2 * | 2/2021 | Suzuki ................... | B25J 9/1656 |
| 11,123,872 B2 * | 9/2021 | Shoji ...................... | B25J 9/1612 |
| 11,312,581 B2 * | 4/2022 | Huang ................... | B25J 9/1612 |
| 11,458,635 B2 * | 10/2022 | Wicks ................. | B25J 15/0004 |
| 11,465,288 B2 * | 10/2022 | Takeuchi ............... | B25J 9/1697 |
| 11,498,210 B2 * | 11/2022 | Oka ....................... | B25J 9/1653 |
| 11,559,894 B2 * | 1/2023 | Oka ......................... | B25J 9/161 |

OTHER PUBLICATIONS

Dec Group delivers The world's first blood bank robot (Year: 2022).*
Robotic Palletizers—Tinsley Equipment Company (Year: 2023).*
U.S. Appl. No. 16/834,931, filed March 30, 2020.

* cited by examiner

*Primary Examiner* — Ronnie M Mancho
(74) *Attorney, Agent, or Firm* — Venable LLP

(57) ABSTRACT

Methods and apparatus for an end-of-arm tool having multiple robotic grippers, such as two or more grippers, and coordination of motion of the multiple grippers, so as to allow for automated testing and packaging of sealable bags conveyed to an inspection station.

23 Claims, 15 Drawing Sheets

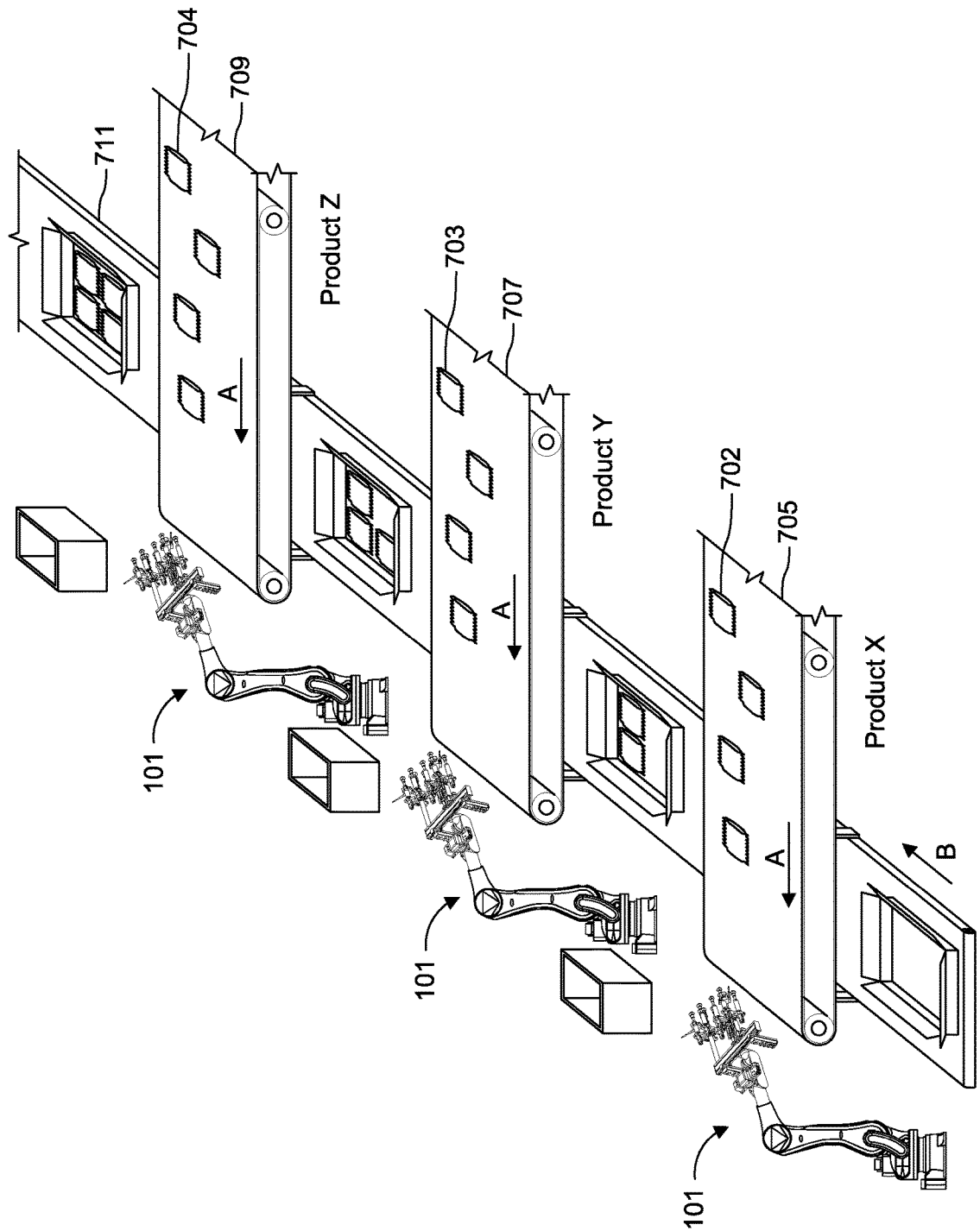

MULTI-GRIPPER SYSTEM

BACKGROUND

1. Technical Field

The field generally relates to robotic end-of-arm tools and systems for the automated sorting and conveyance of sealable bags and methods of use thereof.

2. Discussion of Related Art

Currently, the determination of whether a sealable bag is properly sealed, and the subsequent sorting and packing of the sealable bag, is a labor-intensive process with inherent inefficiencies. There remains a need for a system and method for automating the process.

SUMMARY

In one aspect, disclosed herein is an end-of-arm tool having multiple robotic grippers, such as two or more grippers, and coordination of motion of the multiple grippers, so as to allow for automated testing, lifting and packaging of sealable bags. Because multiple robotic grippers are provided on the end-of-arm tool, additional efficiencies are realized, at least for the reason that a corresponding number of multiple bags can be packaged at once for each movement of the robot arm to a packaging station. As a consequence, packaging time is reduced as compared to a situation in which only one bag can be packaged for each movement of the robot arm to the packaging station.

According to one aspect, an end-of-arm tool includes a housing which includes a mount for mechanically mounting the tool to a tip end of a robot arm; a first gripper mounted to the housing and having a first lifting mechanism actuatable to lift a sealable bag; and a second gripper mounted to the housing and having a second lifting mechanism actuatable to lift a sealable bag, wherein the second gripper is movably mounted to the housing by an extension mechanism. Each of the first and second grippers has a plurality of displaceable fingers positioned in a configuration corresponding to dimensions of the sealable bag, each displaceable finger being displaceable and having a sensor for sensing displacement of the displaceable finger by more than a predetermined amount. A controller in communication with said sensors and the first and second lifting mechanisms is configured to retract the second gripper relative to the first gripper, to actuate the first lifting mechanism of the first gripper to lift a first sealable bag, to extend the second gripper, and to actuate the second lifting mechanism to lift a second sealable bag.

For example, in some embodiments, the controller may be configured to determine whether the first sealable bag is sealed by reading the sensors of the first gripper to determine whether all of the plurality of displaceable fingers of the first gripper in contact with the sealable bag are displaced by more than the predetermined amount, and further configured to actuate the first lifting mechanism responsive to a determination that all of said plurality of displaceable fingers in contact with the sealable bag are displaced by more than the predetermined amount. Responsive to a determination that the first sealable bag is not sealed, the controller may be configured to provide a signal to the robot arm to move the tool to a discard station without actuating the second lifting mechanism for lifting of the second sealable bag. On the other hand, responsive to a determination that the first sealable bag is sealed, the controller may be configured to determine whether the second sealable bag is sealed by reading the sensors of the second gripper to determine whether all of the plurality of displaceable fingers of the second gripper in contact with the sealable bag are displaced by more than the predetermined amount, and further configured to actuate the second lifting mechanism responsive to a determination that all of said plurality of displaceable fingers in contact with the sealable bag are displaced by more than the predetermined amount.

According to further aspects, the controller may be configured to direct the robotic arm to transport the sealable bag to a predetermined location based on whether the sealable bag is fully sealed or not fully sealed. For example, the controller may be configured to direct the robotic arm to transport the sealable bag to a packaging station or to a discard station based on whether the sealable bag is fully sealed or not fully sealed.

According to further aspects of the disclosure herein, an automated method for sorting a sealable bag includes the steps of applying pressure to a first sealable bag conveyed at an inspection station so as to determine whether the first sealable bag is sealed, wherein pressure is applied by a first gripper mounted to a housing of an end-of-arm tool mechanically mounted to a robotic arm; lifting the first sealable bag using a first lifting mechanism of the first gripper; and responsive to a determination that the first sealable bag is not sealed, moving the robotic arm to a discard station while the first bag is lifted by the first lifting mechanism. On the other hand, responsive to a determination that the first sealable bag is sealed, pressure is applied to a second sealable bag conveyed at the inspection station so as to determine whether the second sealable bag is sealed, wherein pressure is applied by a second gripper mounted to the housing of the end-of-arm tool; and the second sealable bag is lifted using a second lifting mechanism of the second gripper.

According to aspects described herein, responsive to a determination that both of the first and second bags are sealed, the robotic arm is moved to a packaging station while the first bag is lifted by the first lifting mechanism and the second bag is lifted by the second lifting mechanism. On the other hand, responsive to a determination that the first bag is sealed whereas the second bag is not sealed, the robotic arm is moved to a discard station for discarding of the second bag, and is moved to the inspection station for testing of another second bag by application of pressure thereto and for lifting of this other second bag, this process being repeated until a properly sealed second bag is obtained, after which both of the first and second bags are moved to the packaging station for release and packaging of the first and second bags.

According to aspects described herein, the second gripper is retracted relative to the first gripper prior to application of pressure to the first sealable bag by the first gripper, and the second gripper is extended after lifting of the first sealable bag by the first lifting mechanism of the first gripper.

According to further aspects described herein, each of the first and second grippers may have a plurality of displaceable fingers positioned in a configuration corresponding to dimensions of the sealable bag, each displaceable finger being displaceable and having a sensor for sensing displacement of the displaceable finger by more than a predetermined amount. The determination of whether the first bag is sealed involves reading of the sensors the first gripper so as to determine whether all of said plurality of displaceable fingers of the first gripper in contact with the first sealable bag are displaced by more than the predetermined amount. Likewise, the determination of whether the second bag is sealed involves reading of the sensors the second gripper so as to determine whether all of said plurality of displaceable fingers of the second in contact with the second sealable bag are displaced by more than the predetermined amount.

A vision system in communication with a controller may be used to detect the orientation of the sealable bag and the robotic arm may be manipulated so that the first and second grippers, respectively, are matched to the orientation of the sealable bag.

According to further aspects described herein, a conveyor assembly includes multiple tandem conveyors, including upstream conveyors and downstream conveyors, to convey goods to an inspection station, wherein downstream conveyors move more quickly than upstream conveyors, and wherein upstream conveyors are controlled to stop conveyance responsive to detection of unhandled goods in a downstream conveyor, preferably stopping at a position where goods on the upstream conveyor are positioned at the lip of an advance point onto the downstream conveyor. Each of the multiple conveyors may be positioned end-to-end in roughly the same horizontal plane, such that goods are transferred from one conveyor to the next with an accompanying acceleration in speed, or each of the multiple conveyors may be positioned in a different horizontal plane such that each upstream conveyor is elevated relative to a downstream conveyor, and such that goods drop from one conveyor to the next and are accelerated in speed.

The conveyor assembly may include one or more detectors, such as photosensor/photodetector pairs, each provided for a respective one of the multiple conveyors adjacent the advance point of the respective one of the multiple conveyors, and constructed to detect goods as they arrive at the advance point. A stopped upstream conveyor may be controlled to re-start responsive to detection that the previously unhandled good on the downstream conveyor has been handled, or may be controlled to re-start responsive to re-start of the immediately downstream conveyor.

BRIEF DESCRIPTION OF THE DRAWINGS

Further objectives and advantages will become apparent from a consideration of the description, drawings, and examples.

FIG. 7 is an illustrating depicting multiple stations for packaging a variety of different products (products X, Y and Z) into a box according to an embodiment of the disclosure herein.

DETAILED DESCRIPTION

Some embodiments of the current disclosure herein are discussed in detail below. In describing embodiments, specific terminology is employed for the sake of clarity. However, the disclosure herein is not intended to be limited to the specific terminology so selected. A person skilled in the relevant art will recognize that other equivalent components can be employed and other methods developed without departing from the broad concepts of the current disclosure herein. Any reference cited anywhere in this specification, including the Background and Detailed Description sections, is incorporated by reference in its entirety.

In general, embodiments of the disclosure involve an end-of-arm-tool and methods of use thereof, designed for mounting to the end of a robotic arm or gantry robot or other generalized multi-axis robots. The end-of-arm tool includes multiple robotic grippers, such as two or more grippers. Motion of the multiple grippers is coordinated by a controller for automated sensing, lifting and packaging of snack-sized bags, flexible wrapped packages, pouches, sachet, and/or pillow packs.

Figure 1:
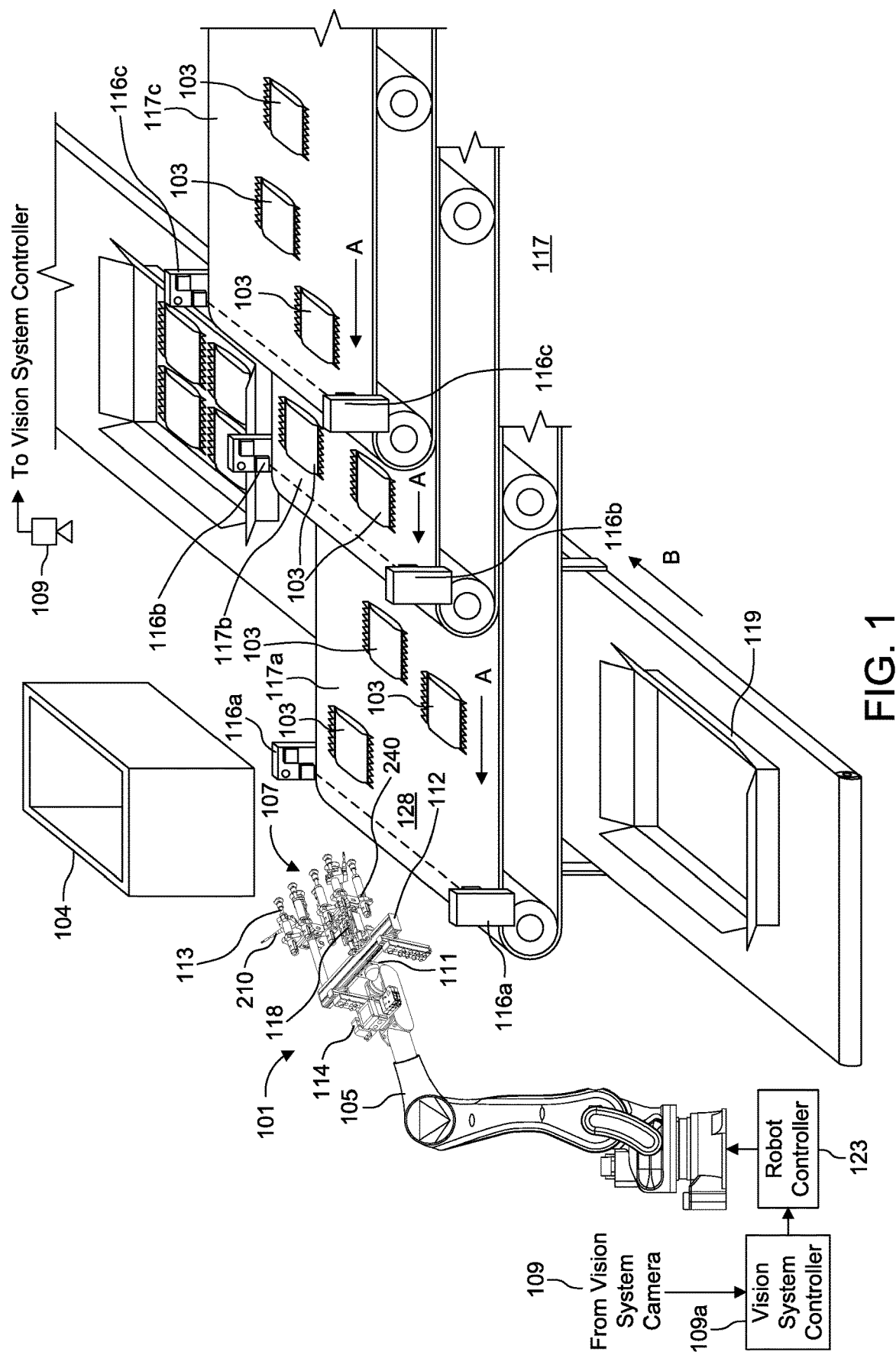
FIG. 1 is an overview showing a 6-axis robotic arm with an end-of-arm tool mounted at its tip, positioned against a pair of conveyors which in this example are perpendicular but which may also be arranged differently such as parallel, with sealed bags being conveyed in direction A for testing and packaging by the end-of-arm tool into boxes conveyed in direction B according to an embodiment of the disclosure herein.

FIG. 1 is a schematic illustrating an example embodiment of the disclosure. In FIG. 1, a robotic system 101 is used for the automated sorting, testing, lifting and packing of a sealable bag 103 which may be a sealed or an unsealed bag. The robotic system includes a robotic arm 105; an end-of-arm tool 107 mechanically mounted to a tip end of the robotic arm; a vision system 109; an accessory module 114; and a controller 123 in communication with the robotic arm, the end-of-arm tool, the vision system, and the accessory module. The end-of-arm tool includes a mount 111 which in this embodiment is a plate with screw holes for mechanical attachment of tool 107 to a tip end of robot arm 105. Attached to mount 111 is housing 112 which in this embodiment is an open housing comprised of slotted rails upon which the constituent elements of the tool are adjustably mounted. In particular, the rails of housing 112 mechanically mount a pair of grippers 210 and 240, of which gripper 210 is fixedly mounted to housing 112 and gripper 240 is extendibly mounted with extension mechanism 118.

It will be understood that although this embodiment includes two grippers, other embodiments may include more than two grippers such as three or more grippers. A single one of the multiple grippers may be fixedly mounted to the housing 112, or all of the multiple grippers may be extendibly mounted, like gripper 240 of the present embodiment which is extendibly mounted via extension mechanism 118, so as to provide for mutual movement of the multiple grippers relative to one another.

Each of grippers 210 and 240 includes a plurality of displaceable fingers 113 each displaceably fixed to its respective gripper and collectively configured in an orientation corresponding to a dimension of the sealable bag, each of the plurality of displaceable fingers being displaceable in an axial direction. Each gripper further includes a lifting mechanism (see 213 and 243 in FIG. 2C) fixed to the gripper and configured to contact and reversibly engage the sealable bag so as to lift the sealable bag.

An accessory module 114 contains sensors and vacuum sources associated with tool 107. The accessory module 114 in this embodiment is mounted to robot arm 105 for purposes of compactness of the overall assembly, so as to ensure clearance with other objects during operations. In other embodiments, accessory module 114 may be mounted onto housing 112.

End-of-arm tool 107 may further include one or more confirmation sensors to validate that the lifting mechanism, once actuated, has captured and correctly holds a sealable bag. In this embodiment, and referring briefly to FIG. 2A, each gripper includes two such sensors: vacuum switch 250*a* and optical sensor 214 for first gripper 210, and vacuum switch 250*b* and optical sensor 244 for second gripper 240. Vacuum switches 250*a* and 250*b* are contained in accessory module 114, whereas optical sensors 214 and 244 are provided in outwardly extending arms in proximity to grippers 210 and 240, respectively, so that the optical sensors have a good view of whether a sealable bag is or is not correctly held.

Reverting to FIG. 1, vision system 109 includes a camera 109 and vision system controller 109*a* and is configured to image sealable bags 103 as they are conveyed by conveyor assembly 117 to inspection station 128. It is expected that the bags are not somehow pre-sorted or aligned, and that they therefore arrive at the inspection station in random (arbitrary) alignments and orientations. Vision system 109 images the bags as they arrive at the inspection station, determines their 360 degree orientation, and orients the robotic arm 105 so that the end-of-arm tool 107 matches the orientation of the bag, to permit testing of the seal of the bag.

Conveyor Assembly System

FIG. 1 includes an illustration of a conveyor assembly 117 in which the speed at which goods are conveyed is accelerated as the goods are transferred from a most upstream conveyor to a most downstream conveyor. As used herein, such a conveyor assembly may sometimes be referred to as an "acceleration conveyor assembly". In some embodiments, each conveyor may be positioned end-to-end at approximately the same height in roughly the same horizontal plane, such that goods are simply transferred from one conveyor to the next with an accompanying acceleration in speed. In the embodiment described here, each conveyor in acceleration conveyor assembly 117 is positioned in a different, elevated horizontal plane and as such, is sometimes referred to herein as a "waterfall conveyor assembly" in the sense that each upstream conveyor is elevated slightly relative to a downstream conveyor, such that goods drop in a waterfall effect from one conveyor to the next.

In conveyor assembly 117, multiple tandem conveyors, including upstream conveyors and downstream conveyors, convey goods to an inspection station, wherein downstream conveyors move more quickly than upstream conveyors, and wherein upstream conveyors are controlled to stop conveyance responsive to detection of unhandled goods in a downstream conveyor, preferably stopping at a position where goods on the upstream conveyor are positioned at the lip of an advance point onto the downstream conveyor.

More particularly, in this embodiment, conveyor assembly 117 includes three conveyors 117*a*, 117*b*, 117*c* arranged in tandem (serially) from a most downstream conveyor 117*a* to a most upstream conveyor 117*c*. Each conveyor moves in a direction depicted by arrow A so as to convey goods (such as sealable bags 103) to inspection station area 128 (or to a position where the goods are otherwise handled). Each upstream conveyor transfers conveyed goods onto an immediately downstream conveyor at an advance point defined in this embodiment as the lip of the upstream conveyor. Downstream conveyors move more quickly than upstream conveyors. In this embodiment, each subsequent downstream conveyor moves at an extra multiple of the speed of the immediate upstream conveyor, such that given speed "X" for conveyor 117*c*, conveyor 117*b* moves at speed 2X and conveyor 117*a* moves at speed 3X. It will be understood that these speeds are examples only, suitable for the nature of the conveyed goods in present embodiment, such as the weight and size and density of the conveyed goods, together with considerations of the handling capabilities and throughput of the conveyed goods at the inspection station. In other embodiments, the speeds of each conveyor should be adjusted based on the weight and size and density of the conveyed goods, and based on the handling capabilities and throughput of the conveyed goods at the inspection station.

For each conveyor, a photosensor/photodetector pair is arranged adjacent the advance point so as to determine that goods have reached the advance point. Thus, photosensor/photodetector pair 116*a* is arranged adjacent the advance point of conveyor 117*a*, photosensor/photodetector pair 116*b* is arranged adjacent the advance point of conveyor 117*b*, and photosensor/photodetector pair 116*c* is arranged adjacent the advance point of conveyor 117*c*. The sight line for each photosensor/photodetector pair, across the advance point, is indicated in FIG. 1 by a dashed line. Responsive to detection of unhandled good(s) at the advance point of any of the conveyors, the immediately upstream conveyor is stopped, and preferably is stopped after sufficient forward motion to transport goods to the advance point of the upstream conveyor, as detected by the photosensor/photodetector pair of the upstream conveyor. The upstream conveyor is restarted responsive to detection (using the photosensor/photodetector pair of the downstream conveyor) that the previously unhandled good(s) on the downstream conveyor have been handled (such as by packaging or discarding of the previously unhandled good(s)).

Although in this embodiment a photosensor/photodetector pair 116*a* is provided at the advance point for the most downstream conveyor 117*a*, this is not strictly necessary given the presence of vision system 109. More particularly, vision system 109 can detect the presence of goods at inspection station 128 without the need for photosensor/photodetector pair 116*a*, and can be used in the place of photosensor/photodetector pair 116*a* to control movement of downstream conveyor 117*a*, such movement being described as follows.

In one example, consider a situation where all three conveyors 117*a*, 117*b*, 117*c* are all moving at their respective speeds to transport goods (such as sealable bags 103) from a most upstream supply position to a most downstream inspection station 128 for inspection and packaging. Perhaps due to some interruption, one of the goods becomes unhandled and is detected by vision system 109 (or by photosensor/photodetector pair 116*a* if present) at the advance point of conveyor 117*a*. Responsive to detection of goods at the advance point of conveyor 117*a* (which in this embodiment coincides with the position of inspection station 128), conveyor 117*a* is controlled to stop. Upstream conveyors 117*b* and 117*c* continue to run, but immediately upstream conveyor 117*b* is controlled to continue motion only momentarily, enough to transport goods to the advance point of conveyor 117*b* but before the goods are transferred onto conveyor 117*a*. If immediately downstream conveyor 117*a* remains stopped, then responsive to detection of goods at the advance point of conveyor 117*b*, as detected by photosensor/photodetector pair 116*b*, conveyor 117*b* is controlled to stop. Immediately upstream conveyor 117*c* is controlled to continue motion but only momentarily, enough to transport goods to the advance point of conveyor 117*c* but before the goods are transferred onto conveyor 117*b*. If immediately downstream conveyor 117*b* remains stopped, then responsive to detection of goods at the advance point of conveyor 117*c*, as detected by photosensor/photodetector pair 116*c*, conveyor 117*c* is controlled to stop.

Responsive to the handling of goods at the advance point of most downstream conveyor 117*a*, conveyor 117*a* is controlled to re-start and immediately upstream conveyor 117*b* is also controlled to re-start. Responsive to re-start of conveyor 117*b*, immediately upstream conveyor 117*c* is also controlled to re-start.

Operation of the conveyor assembly 117 as described above ensures that goods are transported quickly to the inspection station. Additionally, the increasing speed of each downstream conveyor provides gaps/gapping between product by the time product arrives at the inspection station. Further, the manner in which the goods are handled ensures that they tend to lie on a flat side of the goods by the time that they reach the area of the inspection station, thus presenting the goods in an orientation ready for inspection. Further still, the manner in which the conveyors are stopped and restarted in response to an interruption in handling of the goods ensures that goods are positioned at a spot ready for transport to the next downstream conveyor after the interruption has been addressed and handling has been resumed.

Robotic System

FIG. 1 also illustrates use of the robotic system. In FIG. 1, the vision system 109 locates each bag 103 as it is conveyed on conveyor assembly 117 in a direction A. Grippers 210 and 240 each performs a tactile test of a respective different one of two bags for integrity of an air-tight seal. The lifting mechanisms of each gripper then engages the bags and lifts them whereupon if the seal is intact the sealable bags are packed it into an open box 119 conveyed in a direction B, whereas an unsealed bag is discarded to discard bin 104 if it is not intact.

In this embodiment motion of conveyor assembly 117 in direction A is perpendicular to motion of box 119 in direction B. However, especially given the ability of robot arm 105 to pick and place bags, these directions may also be arranged differently such as parallel.

The terms "end-of-arm tool" and "gripper" are used interchangeably throughout and relate to a mechanical device that is configured to be mechanically coupled to a robotic arm, gantry robot or other generalized multi-axis robots.

The terms "displaceable finger" and "fingers" are used interchangeably throughout and relate to a plurality of displaceable mechanical units mounted onto a gripper. The units are used for at least registering a displacement following contact with a surface of a sealable bag, where the level of displacement is indicative of whether the sealable bag is properly sealed or not. The units are configured such that they correspond to a dimension of the sealable bag and their positioning may be adjustable in for this purpose. Those of ordinary skill will recognize that they can be arranged in any configuration so long as the configuration corresponds to a dimension of the sealable bag that will be contacted in a way that displacement of the fingers can differentiate between a sealed and an unsealed bag.

The term "lifting mechanism" as used throughout refers to a mechanical unit mounted onto a gripper and used for reversibly engaging and lifting a sealable bag. In some embodiments, the lifting mechanism includes a spring-mounted vacuum cup driven by the vacuum generator (see 250 in FIG. 2C) to reversibly engage and lift the sealable bag, however additional mechanisms for lifting the sealable bag can be envisioned.

The term "controller" refers to a component configured to interact with and at least partially command operation of various components including, but not limited to an end-of-arm tool and all related components (e.g. a lifting mechanism and displaceable fingers, and corresponding sensors), a robotic arm, conveyor assembly or assemblies, and a vision system. The controller commands operation of various components at least in part based on information received from the various components. In some embodiments, the controller comprises a processor and/or a software component.

The term "vision system" as used throughout includes a camera detecting optical information, and refers to a system configured for sensing the placement and position of a sealable bag as it arrives at inspection station area 128, and for sensing a 360 degree orientation of the sealable bag.

The term "vacuum switch" or "vacuum check valve" refers to a structure or sensor configured to interact with a lifting mechanism and to provide and/or validate sufficient pressure within a vacuum cup to ensure that a vacuum is achieved when a sealable bag is engaged and lifted by the lifting mechanism.

The term "optical sensor" refers to a structure configured to detect and confirm that a sealable bag is engaged and lifted by a lifting mechanism. The vacuum switch and the optical sensor may operate as a redundant set of confirmation sensors to validate that the lifting mechanism, once actuated, has captured and correctly holds a sealable bag.

The term "sealable bag" (also referred to as a sachet, pouch or stand-up pouch, or pillow) refers to a flexible and sealable container for carrying a product. The sealable bag might or might not be sealed.

In some embodiments, the end-of-arm tool, or gripper, has a plurality of plate-mounted sensing fingers spaced in a rectangular conformation in correspondence to the dimensions of the bag. In some embodiments, the plurality of plate-mounted sensing fingers includes four plate-mounted sensing fingers. These fingers are aligned by the vision system to match the orientation of the bag as it is conveyed, and are pressed by the gripper onto the surface of each bag. If all of the plurality of sensors register sufficient displacement of the fingers, the bag is determined to be intact, much like a human operator who gently squeezes a bag to test for resilience. If any of the sensors does not displace adequately, then it is determined that the bag is not intact (the air-tight seal might be broken or the bag might be empty or nearly so).

In some embodiments, a lifting mechanism such as a vacuum or suction cup is also mounted to the same plate as the sensing fingers for engaging with and lifting the bag. Once a determination is made for a bag (i.e., whether the bag is sealed or unsealed), the lifting mechanism is actuated to lift the bag for packaging or for discarding, as the case may be. For example, in embodiments where the lifting mechanism is a vacuum cup, based on a determination of whether the sealable bag is properly sealed or not, the vacuum cup engages the sealable bag so as to lift the sealable bag. Thereafter, the sealable bag, while lifted by the lifting mechanism, is transported either to a packaging station and a container for packaging, or to a discard station and discard bin 104 for discarding.

In some embodiments, the end-of-arm tool is mechanically coupled to a robotic arm. Examples of suitable mechanical arms are well known to one of ordinary skill in the art. Any robotic arm can be used so long as it provides adequate degrees of freedom, such as 6 degrees of freedom. In some embodiments, a 6-axis robotic arm is adapted to receive the end-of-arm tool described above and throughout. In other embodiments, or gantry robot or another generalized multi-axis robot is adapted to receive the end-of-arm tool.

Grippers System

Embodiments of the grippers described herein are for testing and handling of a sealable bag or unsealed bag, each gripper including: a plurality of displaceable fingers fixed to the housing in a configuration corresponding to dimensions of the sealable bag, each displaceable finger being displaceable such as in an axial direction of the displaceable finger and having a sensor for sensing displacement of the displaceable finger by more than a predetermined amount; a lifting mechanism actuatable to lift the sealable bag; and a controller in communication with the sensor and with the lifting mechanism. The controller is configured to read the sensors so as to determine whether all of the plurality of displaceable fingers in contact with the sealable bag are displaced by more than the predetermined amount, and also configured to actuate the lifting mechanism responsive to a determination that all of the plurality of displaceable fingers in contact with the sealable bag are displaced by more than the predetermined amount.

For coordination and cooperation amongst multiple grippers mounted to the same housing, such as first and second grippers for corresponding first and second bags, in which at least one of the grippers such as the second gripper is movably mounted to the housing by an extension mechanism, the controller is in general configured to retract the second gripper relative to the first gripper, to actuate the first lifting mechanism of the first gripper to lift a first sealable bag, to extend the second gripper, and to actuate the second lifting mechanism to lift a second sealable bag. More specifically, the controller is configured to position and orient the first gripper over a first bag, to move the fingers of first gripper into contact with the first bag to determine whether the first sealable bag is sealed by reading the sensors of the first gripper to determine whether all of the plurality of displaceable fingers of the first gripper in contact with the sealable bag are displaced by more than the predetermined amount, and is further configured to actuate the first lifting mechanism responsive to a determination that all of said plurality of displaceable fingers in contact with the sealable bag are displaced by more than the predetermined amount, which signifies a correctly sealed first bag. Responsive to a determination that the first sealable bag is not sealed, the controller is further configured to provide a signal to the robot arm to move the tool to a discard station without actuating the second lifting mechanism for lifting of the second sealable bag. Responsive to a determination that the first sealable bag is sealed, the controller is configured to lift the first bag and to position and orient the second gripper over a second bag, to extend the second gripper using the extension mechanism, to move the fingers of second gripper into contact with the second bag to determine whether the second sealable bag is sealed by reading the sensors of the second gripper to determine whether all of the plurality of displaceable fingers of the second gripper in contact with the sealable bag are displaced by more than the predetermined amount, and to actuate the second lifting mechanism responsive to a determination that all of said plurality of displaceable fingers in contact with the sealable bag are displaced by more than the predetermined amount, which signifies a correctly sealed second bag. The controller is further configured to actuate the second lifting mechanism responsive to a determination that all of said plurality of displaceable fingers in contact with the second sealable bag are displaced by more than the predetermined amount.

The controller is further configured to provide a signal to the robot arm to move the tool to a packaging station responsive to a determination that all of the plurality of displaceable fingers in contact with the sealable bag are displaced by more than the predetermined amount, and is further configured to provide a signal to the robot arm to move the tool to a discard station responsive to a determination that fewer than all of the plurality of displaceable fingers in contact with the sealable bag are displaced by more than the predetermined amount.

The controller is further configured to deactivate the lifting mechanism to drop the sealable bag responsive to a signal from the robot arm to the controller that the tool is positioned at a packaging station or positioned at a discard station.

Figure 2A:
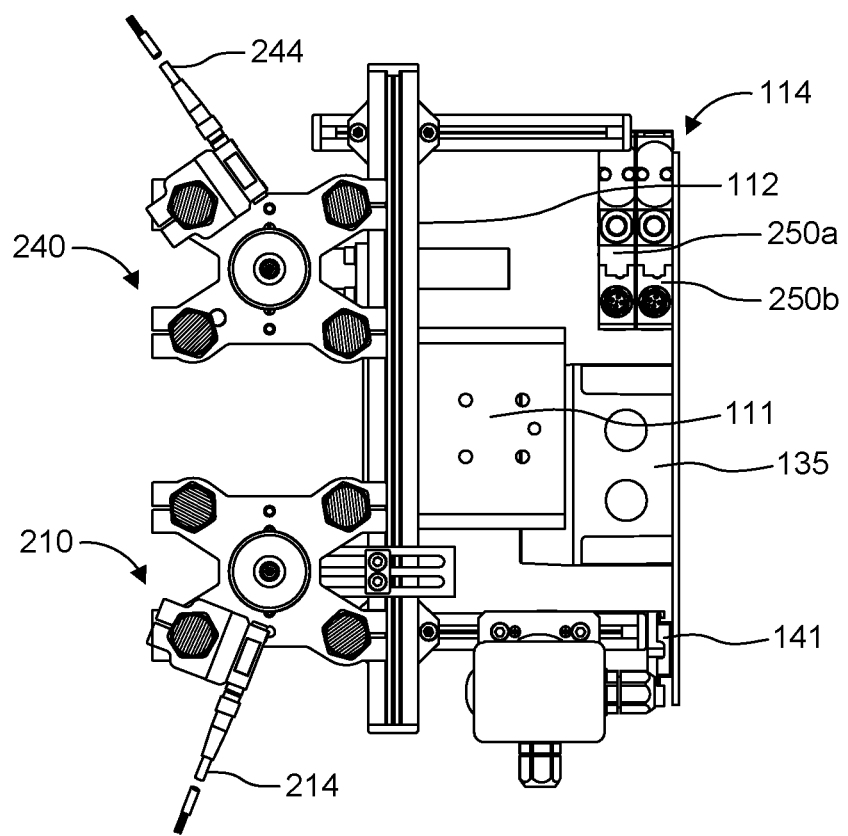
FIGS. 2A-2D are plan, left and right elevations, and perspective views, respectively, of an end-of-arm tool according to an embodiment of the disclosure herein.
Figure 2B:
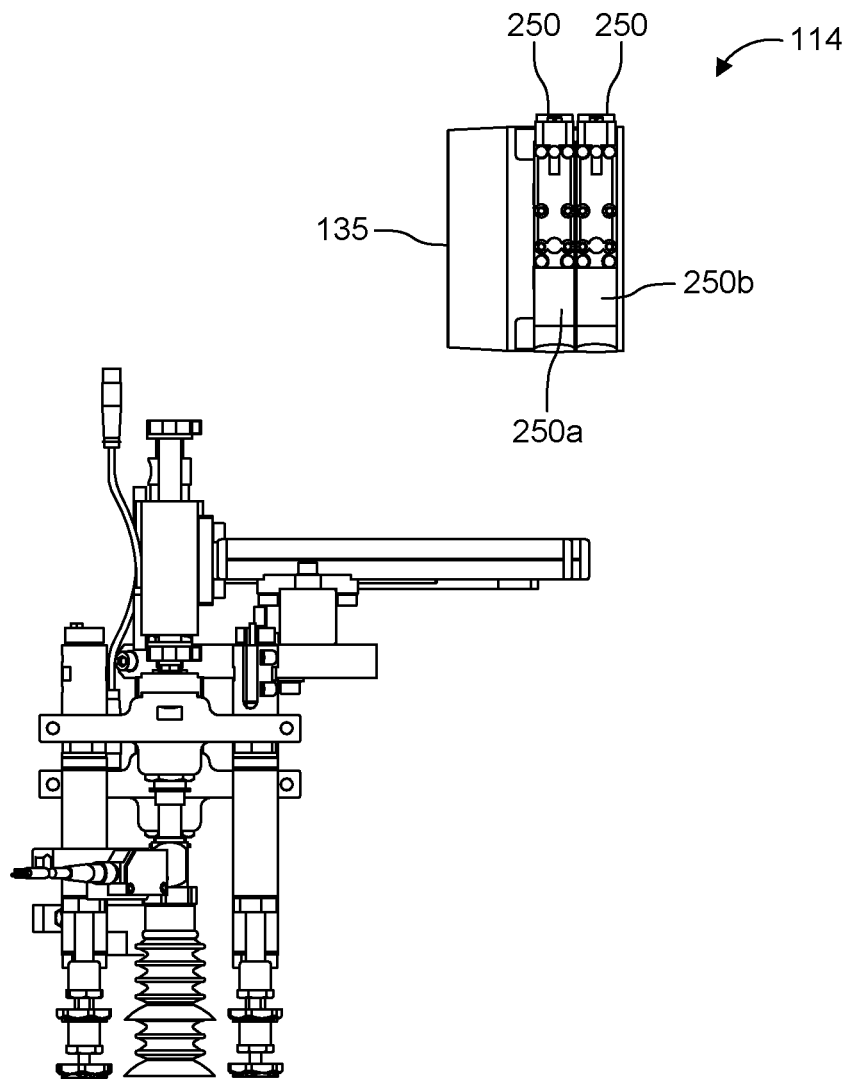
Figure 2C:
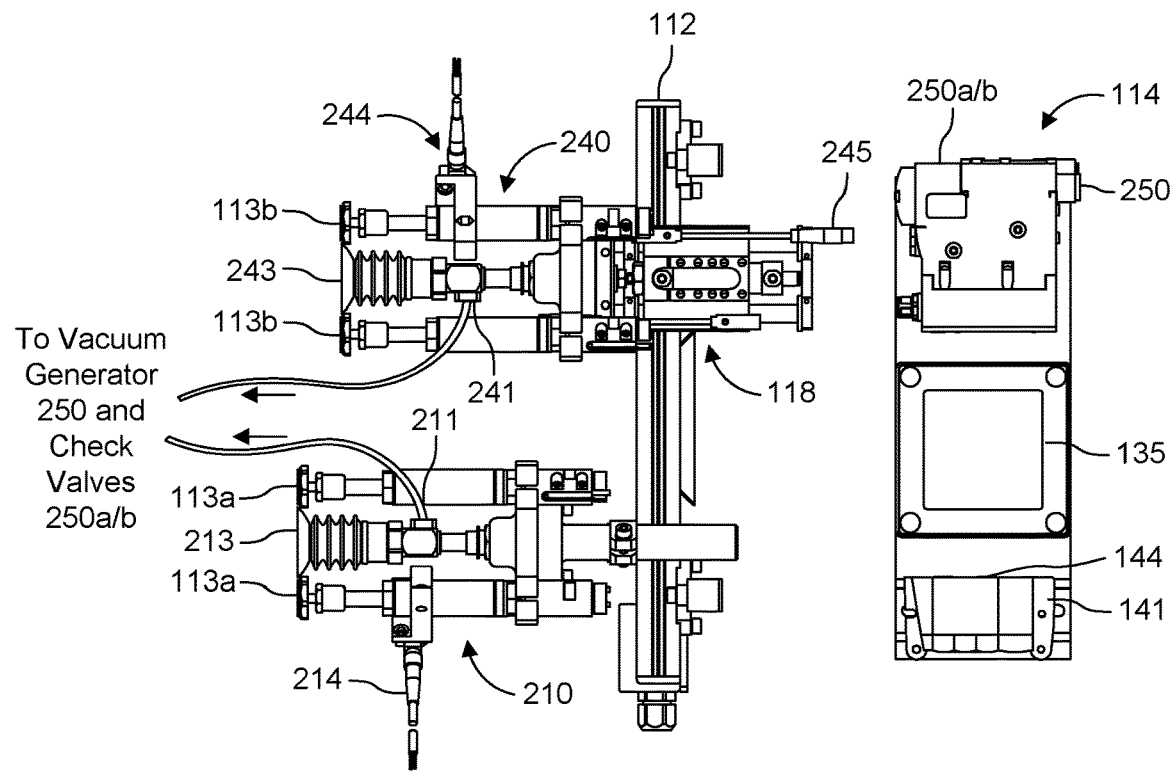
Figure 2D:
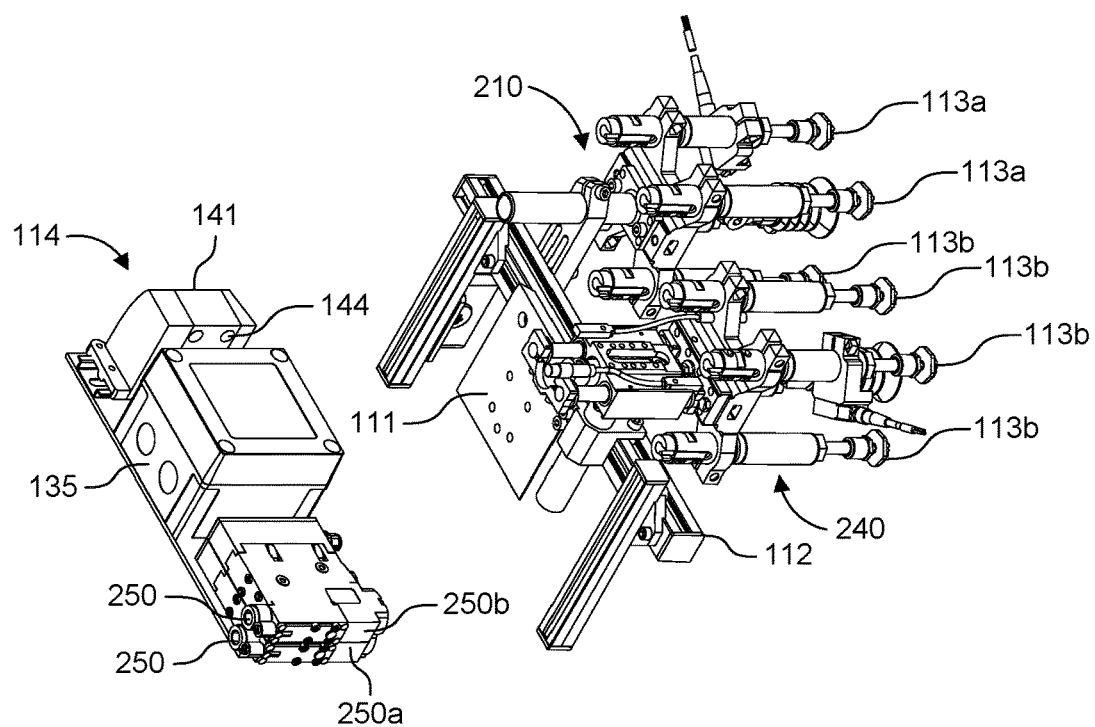

Confirmation sensors may be provided for each gripper, for confirmation the lifting mechanism has successfully engaged with and lifted the sealable bag. In this embodiment, as depicted in FIG. 2A, optical sensor 214 is provided for first gripper 210 and optical sensor 244 is provided for second gripper 240. These sensors are optical sensors, but in other embodiments the confirmation may be provided by vacuum switches (or check valves) 250a and 250b. The controller is further configured to provide a signal to the robot arm to move the tool to a packaging station responsive to a determination that: (1) the confirmation sensor confirms that the lifting mechanism has successfully adhered to and lifted the sealable bag, and (2) that all of the plurality of displaceable fingers in contact with the sealable bag are displaced by more than the predetermined amount.

Each of the displaceable fingers may be spring loaded by a spring and biased by the spring toward a fully extended position, wherein a spring constant of the spring is strong enough for durability over time but not so strong as to apply too much pressure to a sealed bag and rupture a seal on the sealable bag.

An example embodiment is depicted in FIGS. 2A-2D. FIGS. 2A-2D are plan, left elevation, right elevation and perspective views, respectively, of an end-of-arm tool 107 of FIG. 1 and according to an embodiment disclosed herein. The end-of-arm tool 107 of FIGS. 2A-2D includes housing 112 for mounting a pair of grippers 210 and 240, wherein the housing 112 includes a mount 111 for mechanically mounting the end-of-arm tool to the tip end of the robotic arm. Gripper 210 is fixedly mounted to the rails of housing 112 and gripper 240 is extendibly mounted to the rails of housing 112 with extension mechanism 118.

Gripper 210 includes a plurality of displaceable fingers indicated generally at 113a and a vacuum fitting 211 for operation of lifting mechanism 213.

Gripper 240 includes a plurality of displaceable fingers fingers indicated generally at 113b and a vacuum fitting 241 for operation of lifting mechanism 243. Gripper 240 further includes position sensor 245 for sensing end positions during operation of extension mechanism 118. In this embodiment, extension mechanism 118 is a vacuum operated extendible piston which extends gripper 240 away from mount 111 and retracts gripper 240 back towards mount 111. In one retracted position, fingers 113b and lifting mechanism 243 of gripper 240 are retracted relative to their counterparts of gripper 210, as depicted in FIGS. 2A-2D. For example, they are retracted by around 50.00 mm. In one extended position, fingers 113b and lifting mechanism 243 of gripper 240 are coextensive relative to their counterparts of gripper 210, as described later.

Accessory module 114, which in this embodiment is mounted on robot arm 105 rather than on the rails of housing 112, includes junction box 135 for housing couplings and so forth between controller 123 and tool 107, a pair of vacuum generators 250 respectively connected to vacuum fittings 211 and 241 of the first and second grippers, and a pair of LED arrays 141 and 144, with 4 LEDs each, which provide a visual indication of the displacement state of each of the fingers in the first and second grippers. The visual indications provided by the LED arrays are described in greater detail in connection with FIGS. 6A-6G.

In some embodiments, the displaceable figures may be mounted adjustably, such as being mounted on rails or guides, so that they can be adjusted horizontally and vertically across the plane of the gripper so as to allow for repositioning of the fingers to match the size or other characteristics of the sealable bag.

Each of the displaceable fingers further includes an internal spring (not shown) for biasing of the displaceable finger against the sealable bag. The spring in the displaceable fingers has a spring constant adequate to ensure that not too much pressure is applied to pop a sealed bag, but at the same time is strong enough for durability over time.

Figure 4:
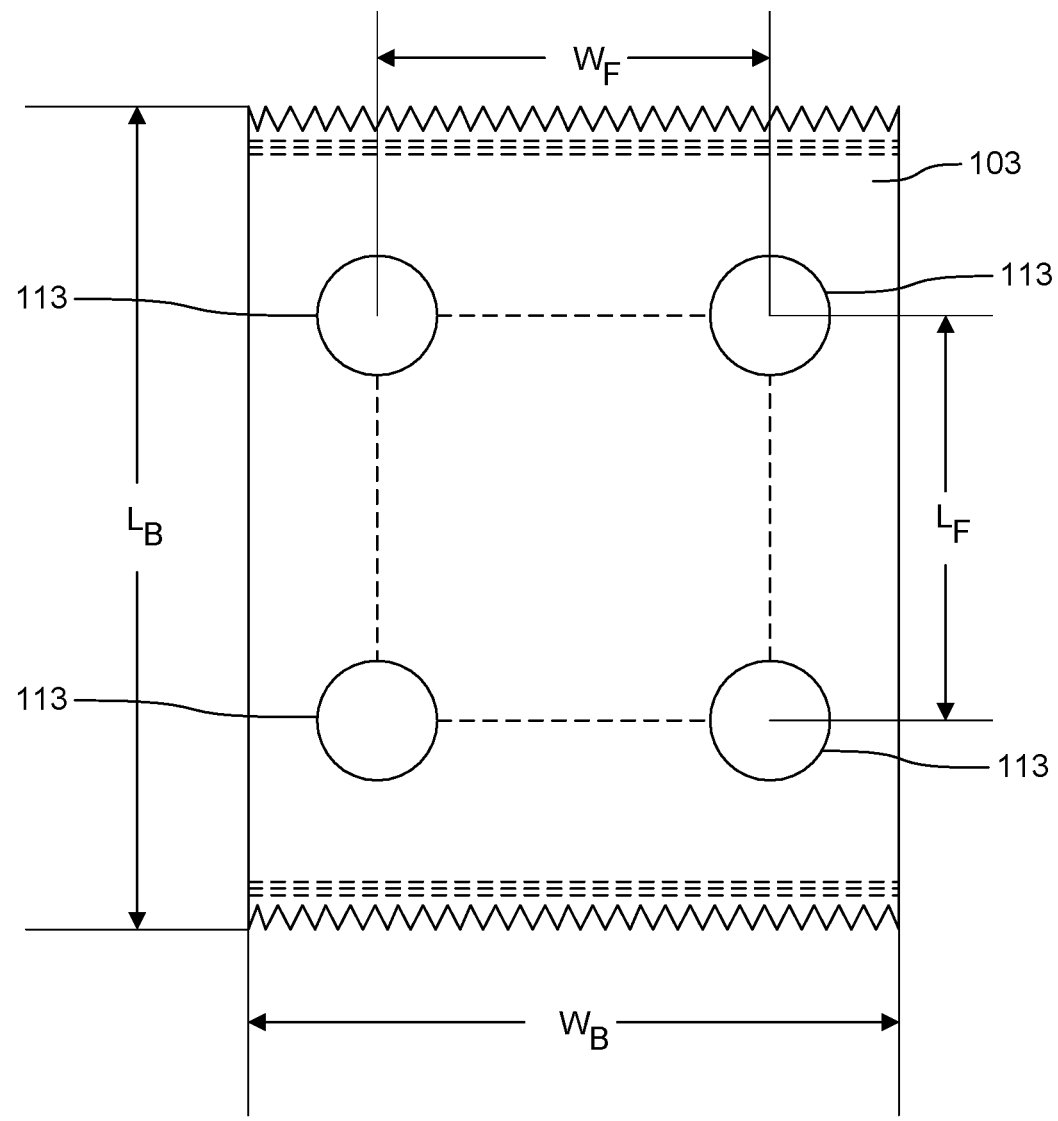
FIG. 4 is a plan view showing the relative spacing of displaceable fingers on an end-of-arm tool with respect to the dimensions of a sealed bag according to an embodiment of the disclosure herein.

In example embodiments, the displaceable fingers are configured such that they correspond to dimensions of a sealable bag. FIG. 4 is a plan view showing the relative spacing of four displaceable fingers 113 with respect to the dimensions of a sealed bag 103. The overall length and width covered by the four displaceable fingers 113 is denoted by $L_F$ and $W_F$, while the overall length and width of the sealable bag 103 is denoted by $L_B$ and $W_B$. Those of ordinary skill will recognize that the configuration of the fingers can be altered to reflect dimensions of alternative containers for testing.

In the example embodiment of FIG. 4, the following dimensions are provided:

$$L_F \times W_F = 3.00 \text{ inches} \times 2.50 \text{ inches}$$

$$L_B \times W_B = 6.25 \text{ inches} \times 5.50 \text{ inches}$$

The length and width of the bag (i.e., $L_B \times W_B = 6.25$ inches×5.50 inches) corresponds to 4.50 inches at the narrowest waist of a sealed bag under inspection with the correct amount of air sealed inside it, and the length and width of the fingers (i.e., $L_F \times W_F = 3.00$ inches×2.50 inches) are selected in consideration of the size of the sealed bag and good positioning for testing of the seal by pressing the fingers against the bag. In some embodiments, the displaceable figures are mounted onto the end-of-arm tool such that they can be adjusted horizontally across width of the end-of-arm tool and such that they can be adjusted vertically along the length of the end-of-arm tool so that sealable bags of varying dimensions can be accommodated.

System

An embodiment of the disclosure herein relates to a system for automated inspecting, sorting and/or packaging of a sealable bag, including: a robotic arm; an end-of-arm tool mechanically mounted to a tip end of the robotic arm, the end-of-arm tool including: a housing which includes a mount for mechanically mounting the tool to a tip end of a robot arm; a first gripper mounted to the housing and having a first lifting mechanism actuatable to lift a sealable bag; a second gripper mounted to the housing and having a second lifting mechanism actuatable to lift a sealable bag, wherein the second gripper is movably mounted to the housing by an extension mechanism. Each of the first and second grippers has a plurality of displaceable fingers positioned in a configuration corresponding to dimensions of the sealable bag, each displaceable finger being displaceable and having a sensor for sensing displacement of the displaceable finger by more than a predetermined amount. A controller in communication with said sensors and the first and second lifting mechanisms is configured to retract the second gripper relative to the first gripper, to actuate the first lifting mechanism of the first gripper to lift a first sealable bag, to extend the second gripper, and to actuate the second lifting mechanism to lift a second sealable bag.

One or more confirmation sensors may be provided in correspondence to each lifting mechanism, to validate that the lifting mechanism, once actuated, has captured and correctly holds a sealable bag. In this embodiment, each gripper includes two such sensors: a vacuum switch and an optical sensor for each of the first and second grippers.

In some embodiments, the controller may be configured to determine whether the first sealable bag is sealed by reading the sensors of the first gripper to determine whether all of the plurality of displaceable fingers of the first gripper in contact with the sealable bag are displaced by more than the predetermined amount, and further configured to actuate the first lifting mechanism responsive to a determination that all of said plurality of displaceable fingers in contact with the sealable bag are displaced by more than the predetermined amount. Responsive to a determination that the first sealable bag is not sealed, the controller may be configured to provide a signal to the robot arm to move the tool to a discard station without actuating the second lifting mechanism for lifting of the second sealable bag. On the other hand, responsive to a determination that the first sealable bag is sealed, the controller may be configured to determine whether the second sealable bag is sealed by reading the sensors of the second gripper to determine whether all of the plurality of displaceable fingers of the second gripper in contact with the sealable bag are displaced by more than the predetermined amount, and further configured to actuate the second lifting mechanism responsive to a determination that all of said plurality of displaceable fingers in contact with the sealable bag are displaced by more than the predetermined amount.

According to further aspects, the controller may be configured to direct the robotic arm to transport the sealable bag to a predetermined location based on whether the sealable bag is fully sealed or not fully sealed. For example, the controller may be configured to direct the robotic arm to transport the sealable bag to a packaging station or to a discard station based on whether the sealable bag is fully sealed or not fully sealed.

Figure 3:
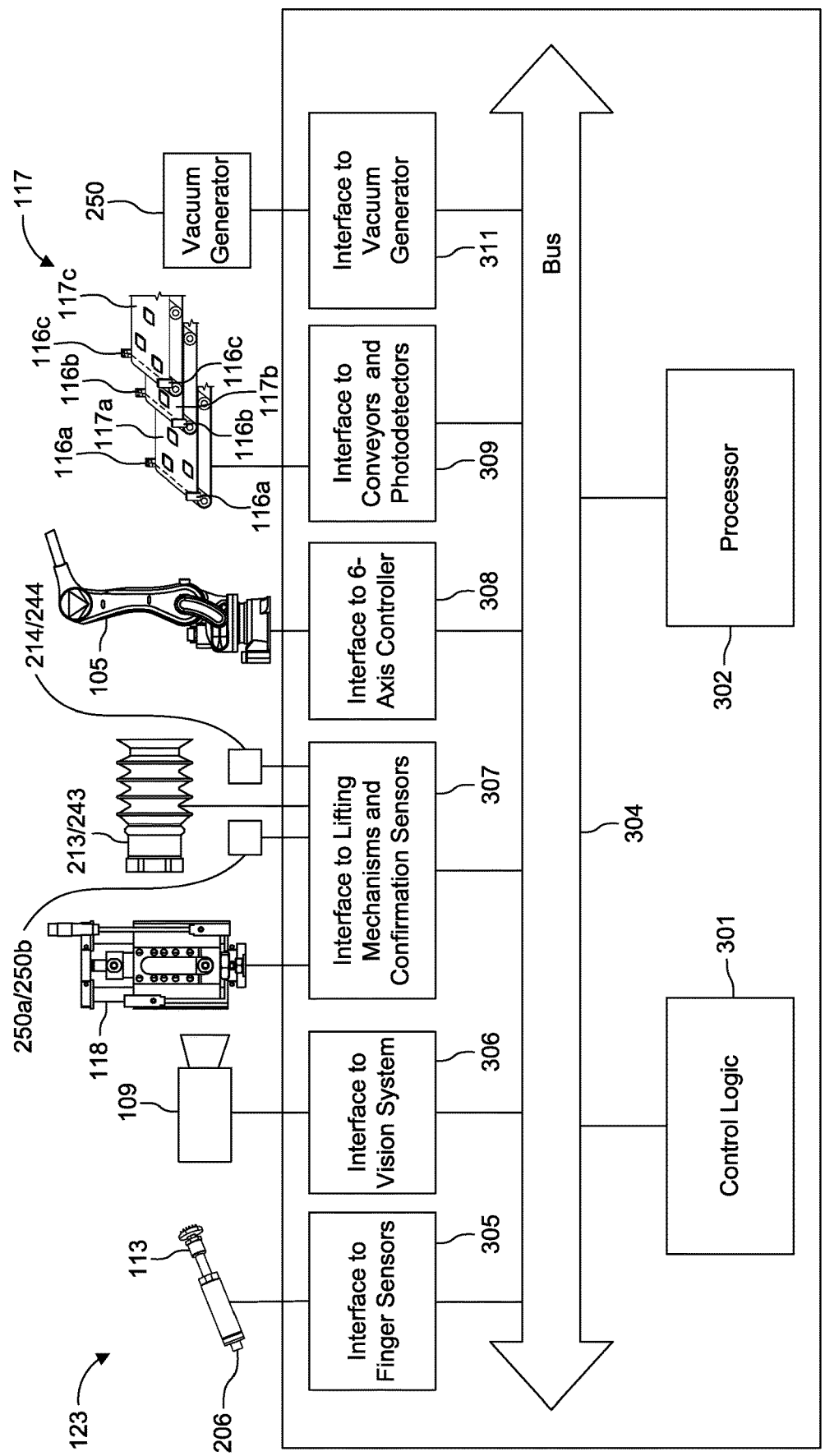
FIG. 3 is a block diagram of a circuitry according to an embodiment of the disclosure herein.

In embodiments disclosed throughout, operation of the system is at least in part coordinated by a controller 123 comprising the circuitry illustrated in FIG. 3. As shown in FIG. 3, the controller is in communication with each of the fingers and sensors, vision system, confirmation sensors, lifting mechanisms, the robotic arm, the conveyor assembly and the vacuum generator that powers the lifting mechanisms of the present embodiment.

In more detail, as shown in FIG. 3, controller 123 includes control logic 301 and processor 302 connected to bus 304. Control logic 301 comprises computer-executable instructions stored in a memory for execution by processor 302 but in other embodiments the control logic may be hardwired. Also connected to bus 304 are interfaces 305, 306, 307, 308, 309 and 311. Interface 305 interfaces to sensors 206 on the displaceable fingers. Interface 306 interfaces to vision system 109. Interface 307 interfaces to lifting mechanisms 213 and 243, to extension mechanism 118, and to confirmation sensors (e.g. to vacuum switches 250a and 250b and/or to optical sensors 214 and 244). Interface 308 interfaces to robot arm 105. Interface 309 interfaces to conveyor assembly 117. Interface 311 interfaces to the vacuum generator 250. Under control of the control logic 301 and processor 302, controller 123 (see FIG. 1) operates system 101 for conveyance of goods by conveyor assembly 117, orientation of the end-of-arm tool 107 to match the orientation of sealable bags conveyed to an inspection station 128, inspection of the seal of the bag at the inspection station, lifting and manipulation of bags, and packaging or discarding sealable bags in dependence on testing for a proper seal, as described throughout.

Method

An embodiment of the instant disclosure herein relates to an automated method for testing and sorting a sealable bag including the steps of applying pressure to a first sealable bag conveyed to an inspection station so as to determine whether the first sealable bag is sealed, wherein pressure is applied by a first gripper mechanically mounted to a housing of an end-of-arm tool mechanically mounted to a robotic arm; lifting the first sealable bag using a first lifting mechanism of the first gripper; and responsive to a determination that the first sealable bag is not sealed, moving the robotic arm to a discard station while the first bag is lifted by the first lifting mechanism. On the other hand, responsive to a determination that the first sealable bag is sealed, pressure is applied to a second sealable bag conveyed to the inspection station so as to determine whether the second sealable bag is sealed, wherein pressure is applied by a second gripper mounted to the housing of the end-of-arm tool; and the second sealable bag is lifted using a second lifting mechanism of the second gripper.

According to aspects described herein, responsive to a determination that both of the first and second bags are sealed, the robotic arm is moved to a packaging station while the first bag is lifted by the first lifting mechanism and the second bag is lifted by the second lifting mechanism, for release and packaging of the first and second bags. On the other hand, responsive to a determination that the first bag is sealed whereas the second bag is not sealed, the robotic arm is moved to a discard station while the second bag is lifted by the second lifting mechanism for discarding of the second bag, the second bag is discarded, and the robotic arm is moved to the inspection station for testing of another second bag by application of pressure thereto and for lifting of this other second bag, this process being repeated until a properly sealed second bag is obtained, after which both of the first and second bags are moved to the packaging station for release and packaging of the first and second bags.

According to aspects described herein, the second gripper is retracted relative to the first gripper prior to application of pressure to the first sealable bag by the first gripper, and the second gripper is extended after lifting of the first sealable bag by the first lifting mechanism of the first gripper.

According to further aspects described herein, each of the first and second grippers may have a plurality of displaceable fingers positioned in a configuration corresponding to dimensions of the sealable bag, each displaceable finger being displaceable and having a sensor for sensing displacement of the displaceable finger by more than a predetermined amount. The determination of whether the first bag is sealed involves reading of the sensors the first gripper so as to determine whether all of said plurality of displaceable fingers of the first gripper in contact with the first sealable bag are displaced by more than the predetermined amount. Likewise, the determination of whether the second bag is sealed involves reading of the sensors the second gripper so as to determine whether all of said plurality of displaceable fingers of the second in contact with the second sealable bag are displaced by more than the predetermined amount.

A vision system in communication with a controller may be used to detect the orientation of the sealable bag and the robotic arm may be manipulated so that the first and second grippers, respectively, are matched to the orientation of the sealable bag.

Figure 5:
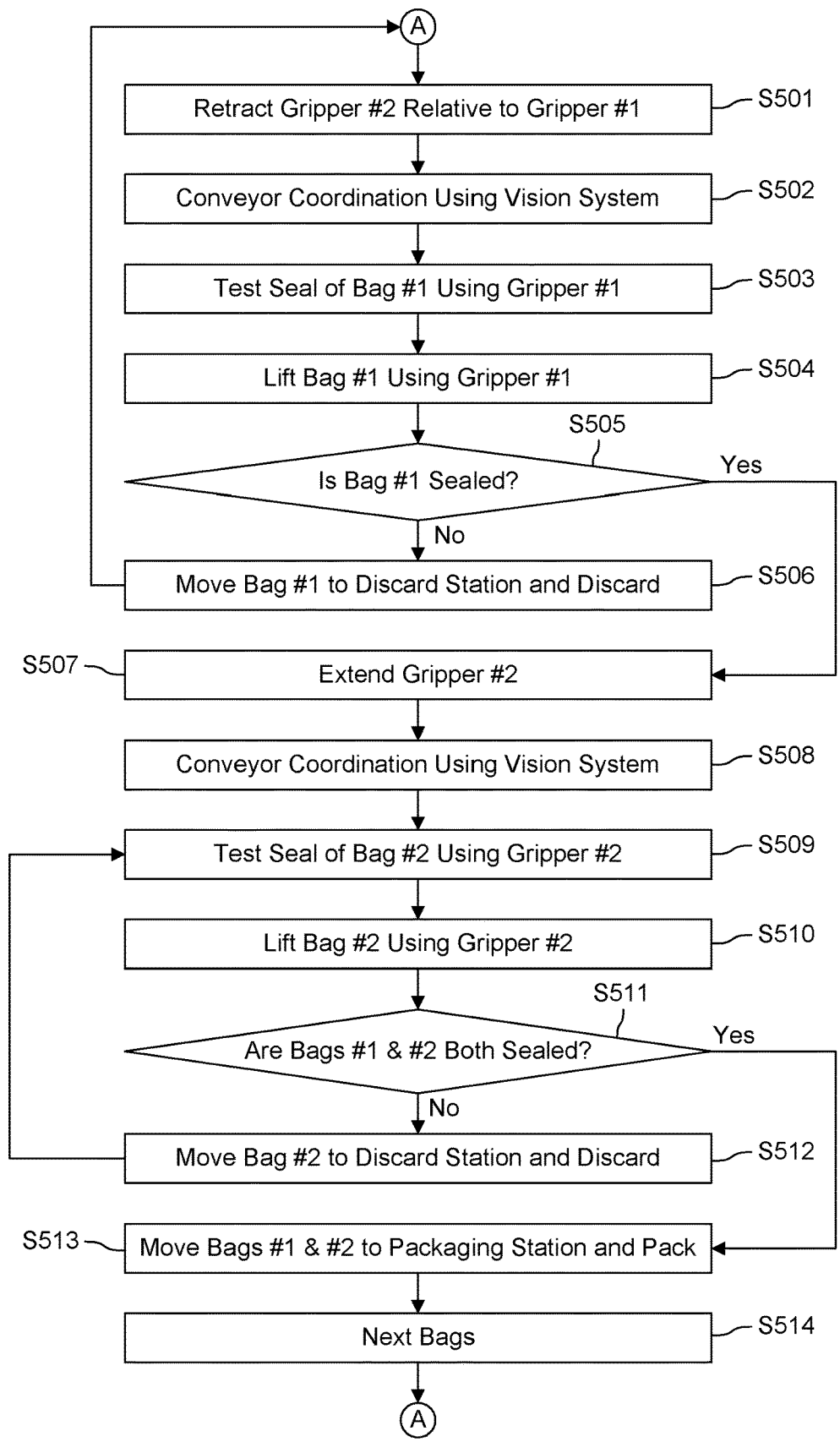
FIG. 5 is a flow diagram depicting an example method for the automated sorting of sealable bags according to an embodiment of the disclosure herein.

An embodiment of the instant disclosure herein relates to the automated method for sorting a sealable bag as depicted in FIG. 5, and as shown diagrammatically in sequence at FIGS. 6A to 6G.

In step S501, gripper 240 is retracted relative

Here, gripper 210 is mounted fixedly to the rails of housing 112, but it is understood that in other embodiments, both grippers 210 and 240 may be mounted movably by respective extension mechanisms, in which case, retraction of one gripper relative to another is the same as mutual movement of the grippers.

In step S502, conveyor 117a is controlled with vision system 109 (or with photosensor/photodetector pair 116a, if so equipped) to obtain a transfer of goods via conveyor assembly 117 to inspection station 128, with the start, stop and restart operations described above.

Figure 6A:
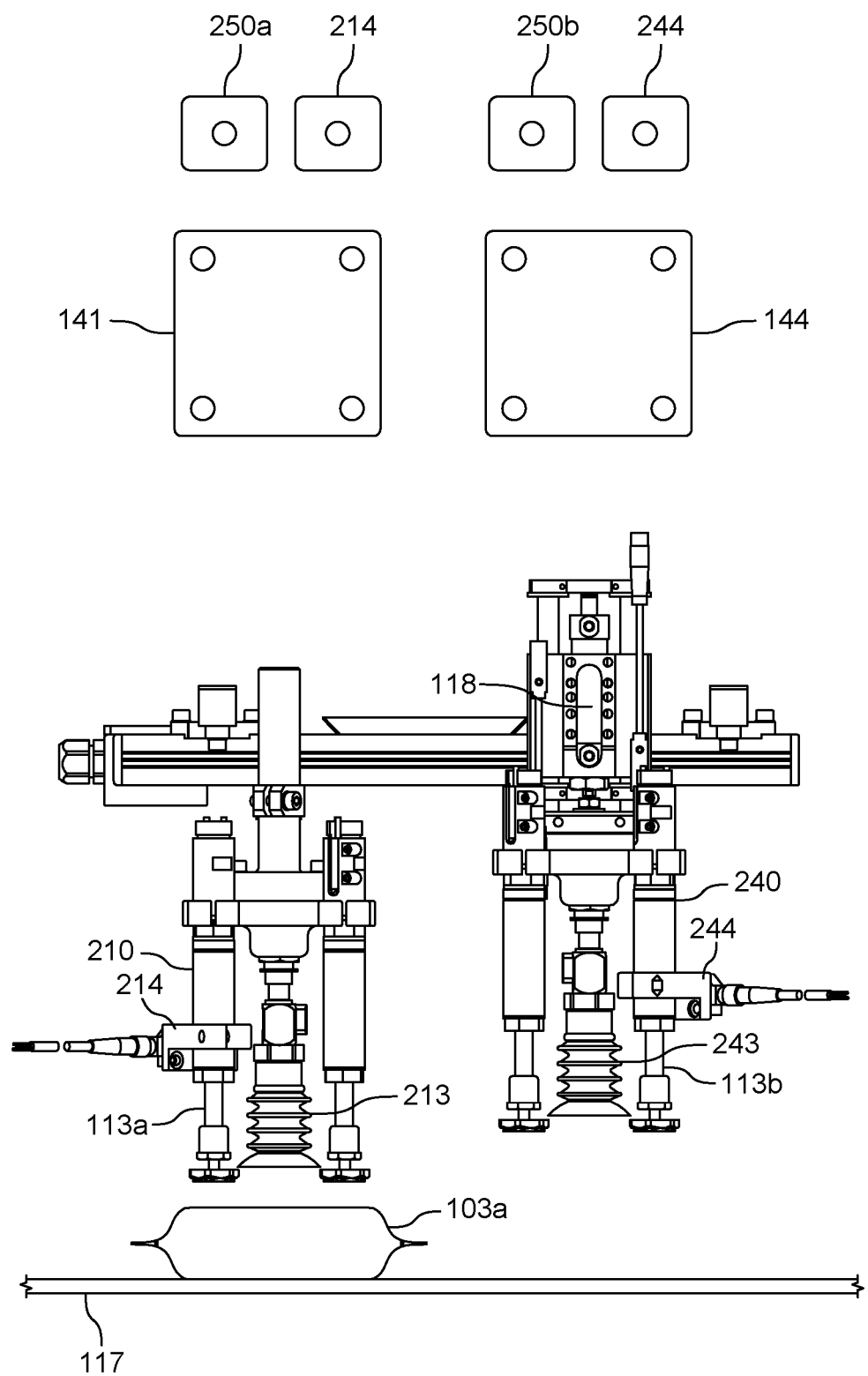
FIGS. 6A-6G show a sequence of a tactile sensing operation according to an embodiment of the disclosure herein.
Figure 6B:
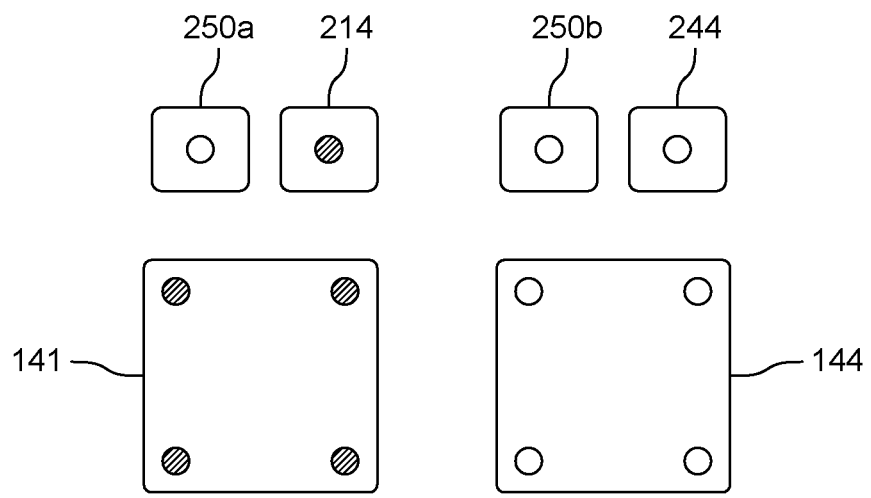
Figure 6B:
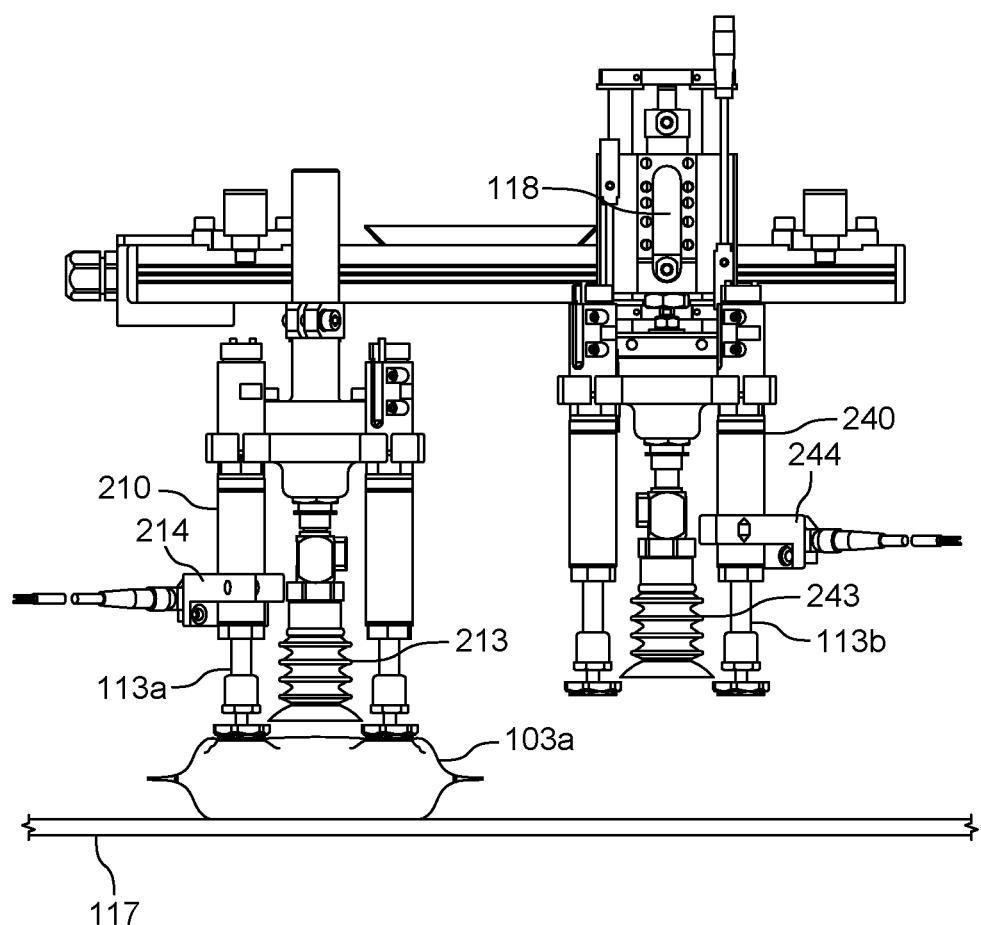

In step S503, gripper 210 is moved to test the seal of a first sealable bag 103a, as shown at FIG. 6A. More specifically, a target sealable bag is initially identified by vision system 109 and end-of-arm tool 107 is guided by the vision system 109 so as to move the first gripper into a matching orientation with the first sealable bag and so as to apply pressure by the first gripper to the first sealable bag, as shown at FIG. 6B. The first sealable bag is then tested to determine if it is properly sealed. Specifically, as shown in FIG. 6B, if all of the displaceable fingers 113a (or tactile fingers) on first gripper 210 become displaced as the sealed bag offers resistance, it is determined that the bag is properly sealed. On the other hand, if as shown in FIG. 6E, less than all of the displaceable fingers (or tactile fingers) on first gripper 210 become displaced as the sealed bag offers resistance, it is determined that the bag is not properly sealed.

Figure 6C:
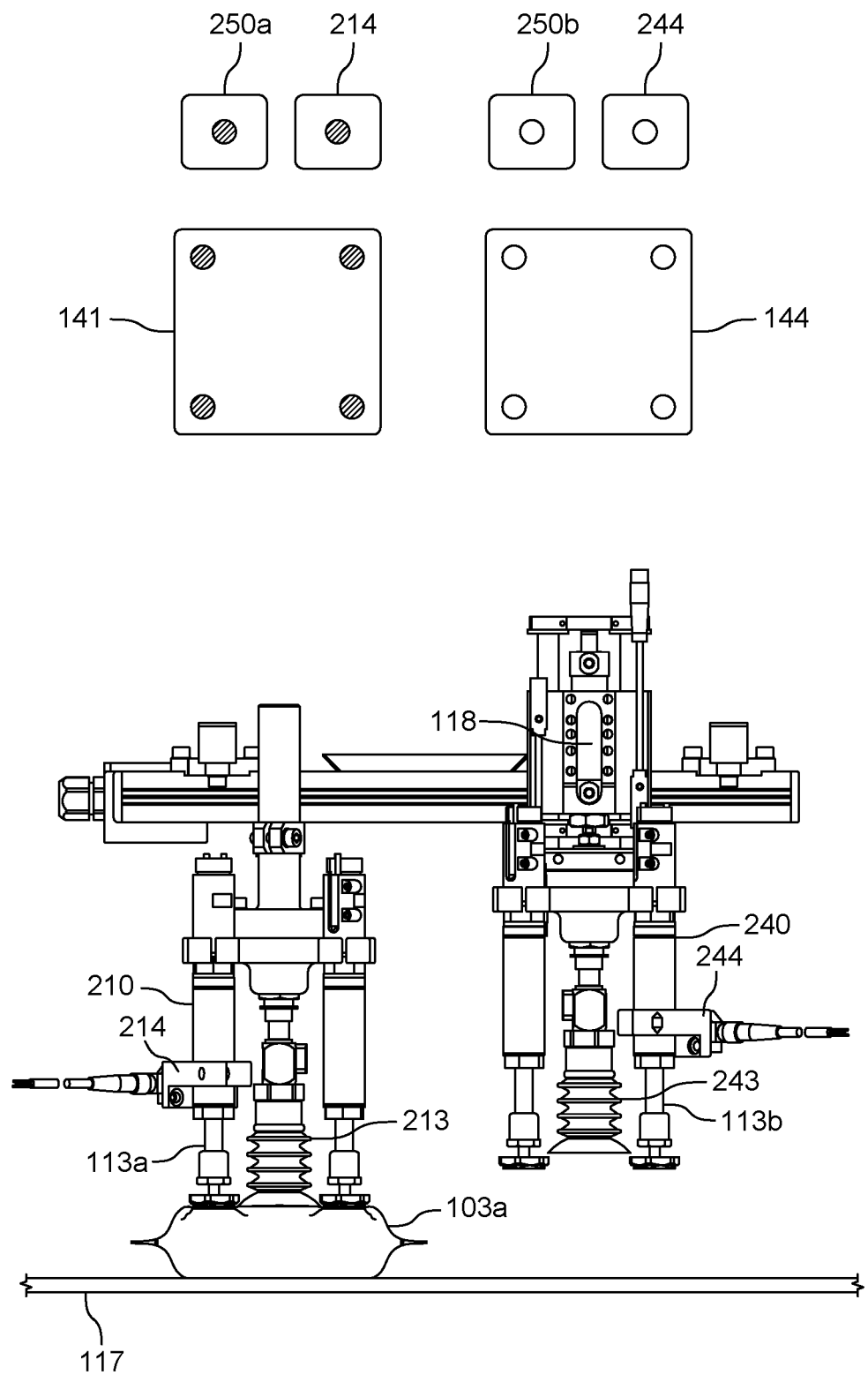
Figure 6D:
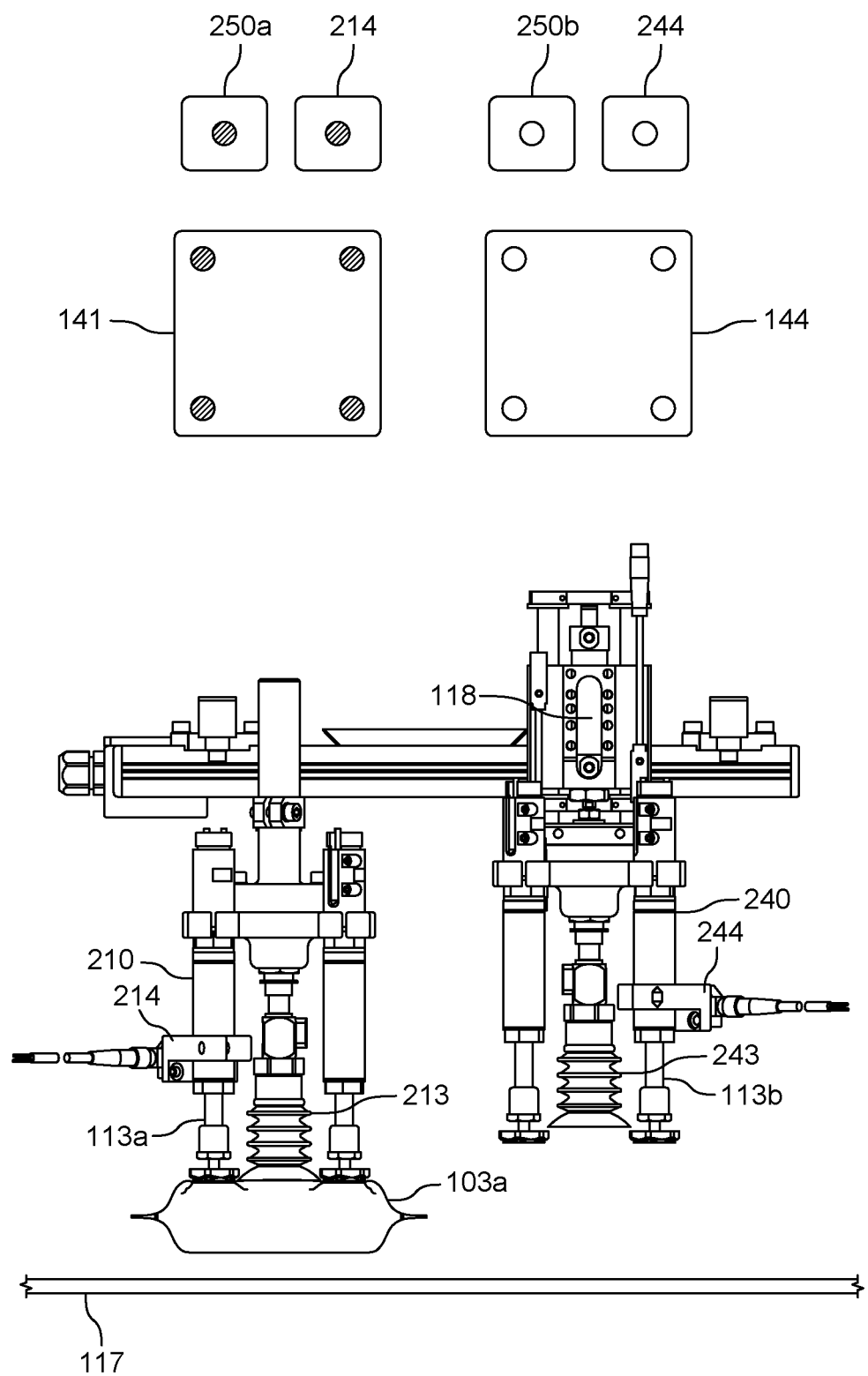
Figure 6E:
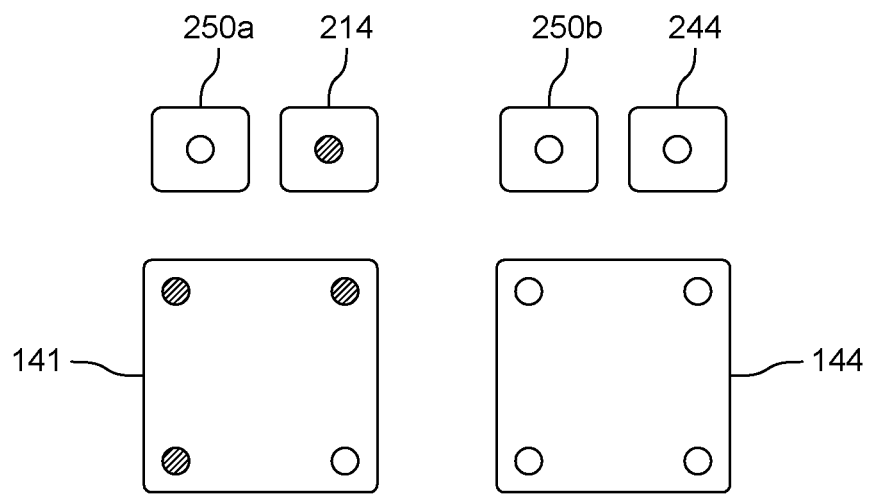
Figure 6E:
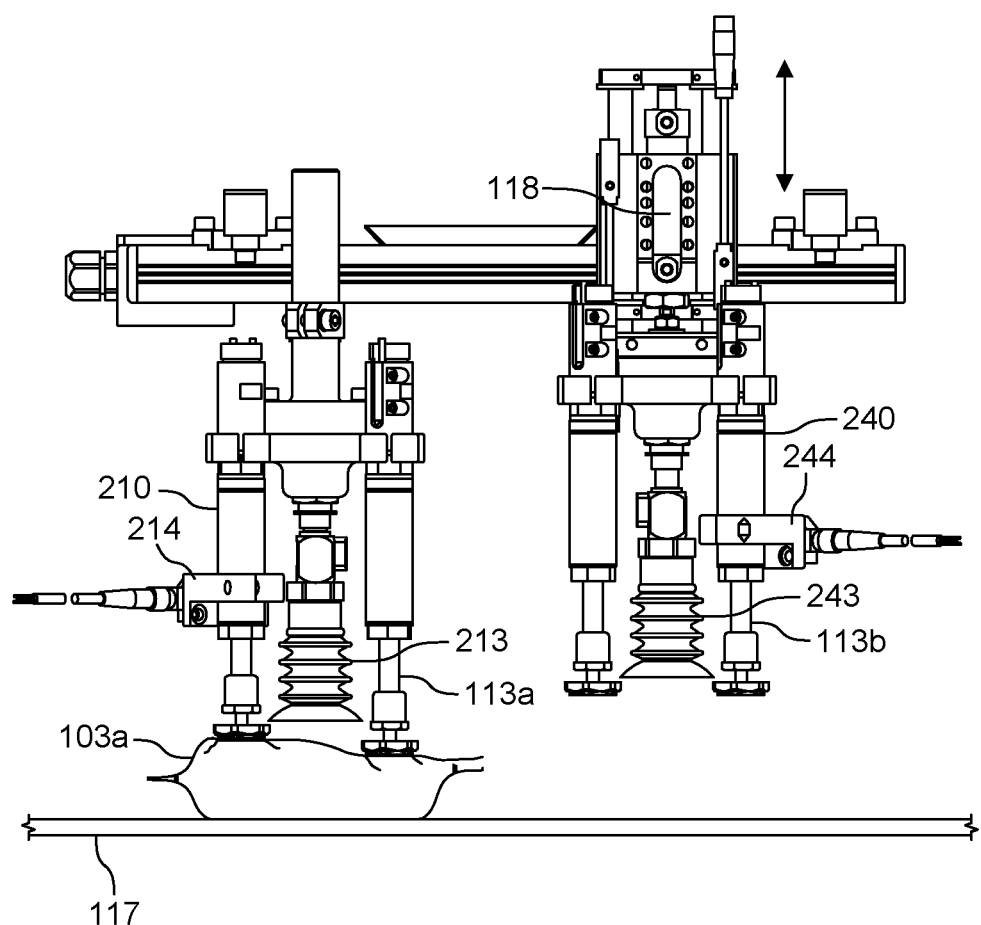

In step S504, first lifting mechanism 213 of first gripper 210 is actuated to lift first bag 103a, as shown in FIG. 6C. A confirmation sensor or sensors such as optical sensor 214 and/or vacuum switch 250a may be used to confirm that first lifting mechanism 213 has actually succeeded in lifting the bag, as shown in FIGS. 6C and 6D.

If it is determined that the first bag 103a is not sealed, then flow branches at step S505 and proceeds to step S506 where first bag 103a is moved to a discard station and discarded. Thereafter, flow returns to step S501 to confirm that gripper 240 is retracted relative to gripper 210 and for a repetition of testing of a first bag for proper seal.

On the other hand, if it is determined that the first bag 103a is properly sealed, then flow proceeds from step S505 to step S507 where second gripper 240 is extended. Second gripper 240 may be extended such that its fingers are coextensive to those of first gripper 210, or it may be extended beyond those of the first gripper.

In step S508, conveyor 117a is continued to be controlled with vision system 109 (or with photosensor/photodetector pair 116a, if so equipped) to obtain a transfer of goods via conveyor assembly 117 to inspection station 128, with the start, stop and restart operations described above.

Figure 6F:
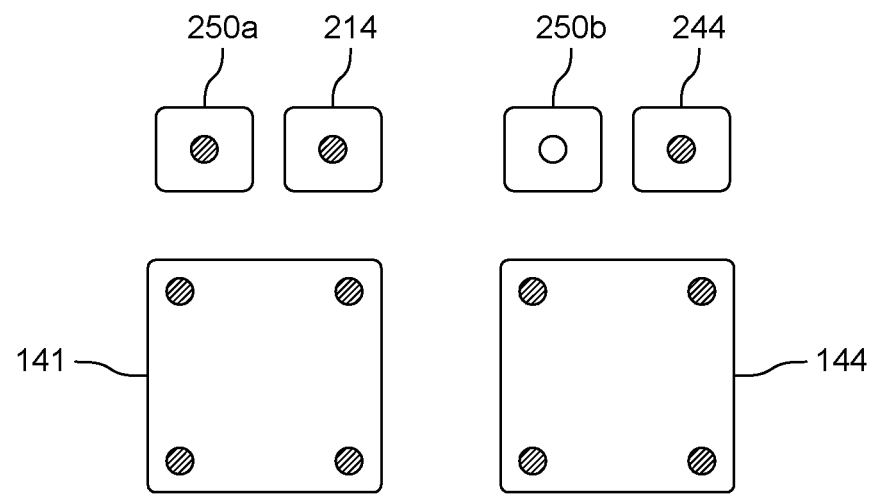
Figure 6F:
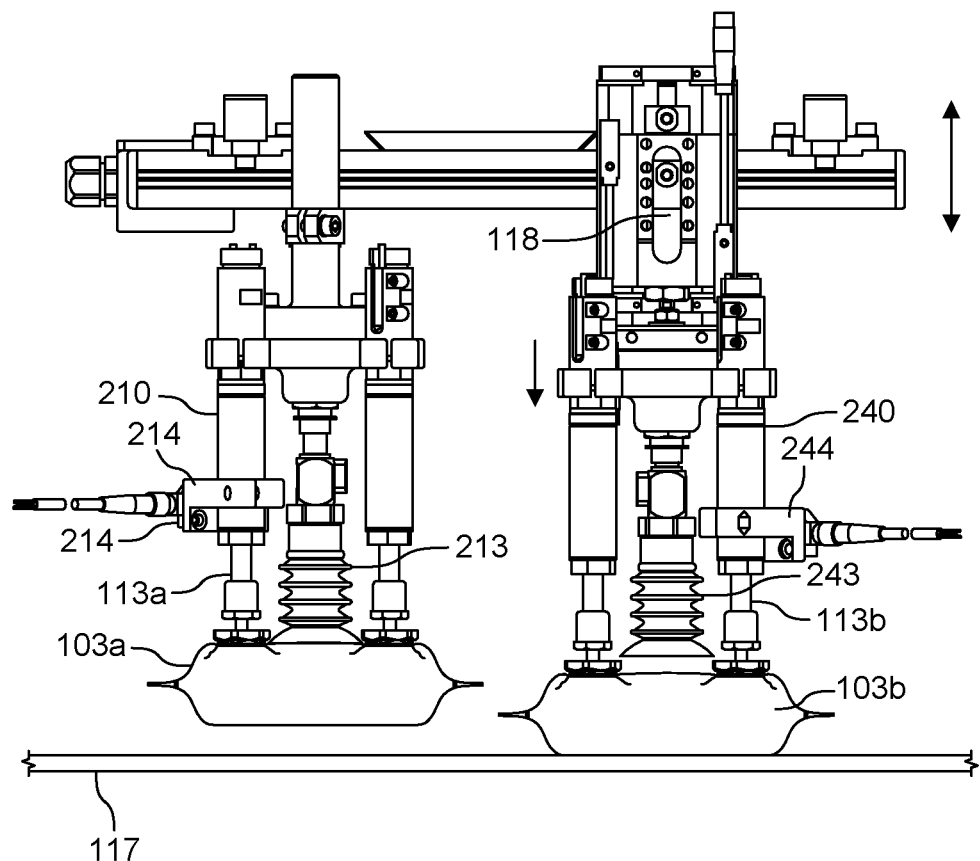

At step S509, second bag 103b is tested by second gripper 240 for a proper seal while first gripper 210 continues its hold on first bag 103a, as shown in FIG. 6F As in step S503, a target sealable bag is initially identified by vision system 109 and end-of-arm tool 107 is guided by the vision system 109 so as to move the second gripper into a matching orientation with the second sealable bag and so as to apply pressure by the second gripper to the second sealable bag. The second sealable bag is then tested to determine if it is properly sealed. Specifically, if all of the displaceable fingers 113b (or tactile fingers) on second gripper 240 become displaced as the sealed bag offers resistance, it is determined that the bag is properly sealed. On the other hand, if less than all of the displaceable fingers (or tactile fingers) on second gripper 240 become displaced as the sealed bag offers resistance, it is determined that the bag is not properly sealed.

Figure 6G:
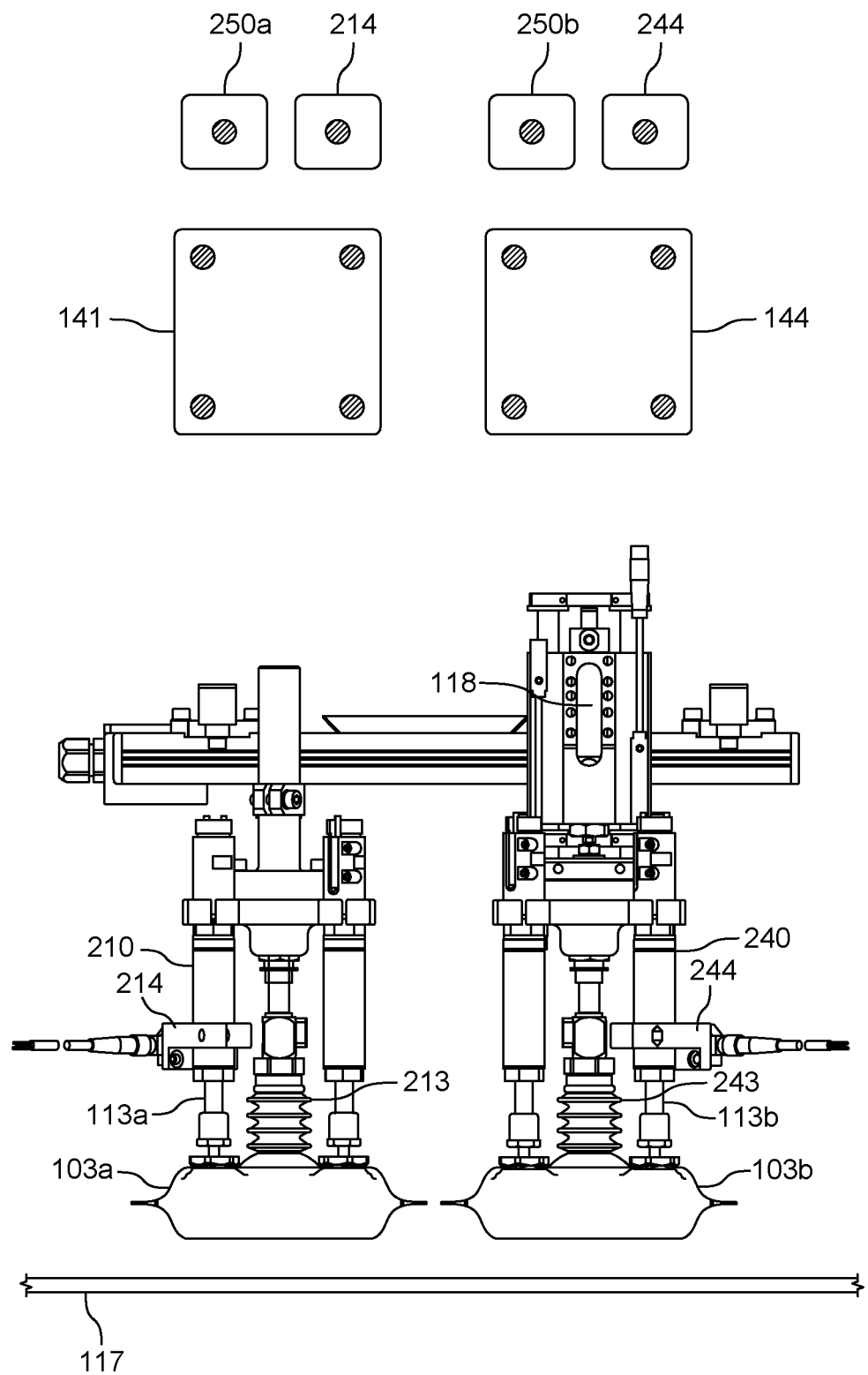

In step S510, second lifting mechanism 243 of second gripper 240 is actuated to lift second bag 103b, as shown in FIG. 6G. A confirmation sensor or sensors such as optical sensor 244 and/or vacuum switch 250b may be used to confirm that second lifting mechanism 243 has actually succeeded in lifting the bag.

At step S511, based on a determination that both of sealable bags 103a and 103b are sealed, flow proceeds to step S513 where both of the first and second bags are moved to a packaging station for packaging in a box. Packaging involves deactivation of lifting mechanisms 213 and 243 so as to allow first and second bags 103a and 103b to be deposited in a box.

On the other hand, if either of the first and second bags is not sealed, then flow branches from step S511 to step S512. Here, because step S505 has already determined that first bag 103a is sealed, it follows that the unsealed bag must be second bag 103b. Accordingly, in step S512, second bag 103b is moved to the discard station and is discarded. Thereafter, flow returns to step S509 for a repeated test and lifting operation on a new second bag, and this process (steps S509, S510 and S511) is repeated until a properly sealed second bag is obtained. Thereafter, given that there is confirmation that both of the first and second bags are properly sealed, flow proceeds to step S513 where both of the first and second bags are moved to a packaging station for packaging in a box.

It will be understood that in other embodiments, control based on the outcome of determinations of proper seals may be postponed until after both the first and second bags have been lifted. In this case, even though the first bag might be unsealed, it is not moved immediately to the discard station as shown in step S506. Rather, flow would proceed to testing and lifting of the second bag, and at step S511, there would be a determination of which (or both) of the first and second bags is sent to the packaging station and/or the discard station.

It will further be understood that in other embodiments, based on a determination that a bag is unsealed, the bag might not be lifted but rather allowed simply to fall off the end of conveyor assembly 117.

Likewise, if optical sensor 214 and/or 244 is not able to confirm that bags 103a and/or 103b have successfully been lifted by the respective lifting mechanism, the bag that should have been engaged by the lifting mechanism, but was not, is allowed to fall off the end of the conveyor.

In step S514, flow returns to step S501 for processing of further bags. It will be understood that in embodiments with more than two grippers, flow would instead proceed to processing of additional bags (third and fourth bags, and so forth).

FIGS. 6A-6G show a sequence of a tactile sensing operation using an end-of-arm tool according to an embodiment described herein. In these figures, accessory module 114 includes two sets 141 and 144 of 4 (four) LEDs each, arrayed in correspondence to the displaceable fingers 113a and 113b of each gripper and lighted by the controller to show a visual depiction of the state of each sensor 206 (sensors 206 are depicted in FIG. 3) of the displaceable fingers, e.g., an unlit state if the sensor fails to sense displacement of the finger by more than the predetermined amount, and a lit state if the sensor senses displacement of the finger by more than the predetermined amount. In FIGS. 6A-6G, the left-hand array of four LEDs 141 corresponds to the fingers 113a of first gripper 210, and the right-hand array of four LEDs 144 corresponds to the fingers 113b of second gripper 240.

In addition, in these figures, it is assumed that the robotic system 101 includes two sets of 2 (two) LEDs arrayed in correspondence to the two confirmation sensors of each gripper, i.e., a left-hand array of a first LED corresponding to vacuum switch 250a for the first gripper a second LED corresponding to optical sensor 214 for the first gripper, and a right-hand array of a first LED corresponding to vacuum switch 250b for the second gripper and a second LED corresponding to optical sensor 244 for the second gripper. These LEDs are lighted by the controller to show a visual depiction of the state of the confirmation sensors, an unlit state if the sensor(s) fails to sense engagement and lifting of the bag, and a lit state if the sensor(s) affirmatively senses engagement and lifting of the bag. In FIGS. 6A-6G, the left-hand pair of two LEDs is shown for the vacuum switch 250a and optical sensor 214 for the first gripper 210, and the right-hand pair of two LEDs is shown for the vacuum switch 250b and optical sensor 244 of second gripper 240.

FIG. 6A shows that first gripper 210 is oriented and positioned over first sealable bag 103a on a conveyor 117 while second gripper 240 is retracted. All LEDs are in the unlit state. Refer to step S501.

FIG. 6B shows that displaceable fingers 113a fingers of the first gripper are brought into contact with first sealable bag 103a, and pressure applied to the first bag, to test for proper seal. Refer to step S503. In this case, the bag is properly sealed, and displaceable fingers 113a become displaced by more than a predetermined amount and this is registered by the sensors, which is in turn visually depicted by the turning "ON" of corresponding LED lights as shown in FIG. 6B. As for the confirmation sensors, optical sensor 214 correctly senses the proximity of bag 103a and its LED is lit, whereas because a vacuum has not yet been directed to lifting mechanism 213, vacuum switch 250a does not yet register a vacuum and its LED remains unlit.

FIG. 6C shows actuation of lifting mechanism 213 of first gripper 210 so as to lift first bag 103a. Refer to step S503. At this time, because a vacuum been directed to lifting mechanism 213 to actuate lifting mechanism 213, vacuum switch 250a registers a vacuum and its LED is now lit. Optical sensor 214 continues to sense the proximity of bag 103a and its LED continues to be lit.

FIG. 6D shows first bag 103a in a lifted state by lifting mechanism 213. Refer to step S504.

FIG. 6E depicts a situation where, during a test for proper seal of first bag 103a, one of the displaceable fingers 113a fails to displace, as a result of a ruptured seal which causes inadequate resistance to less than all of the fingers. As a result, one of the corresponding LED light remains in an "OFF" position, thus indicating that the displaceable finger 113a was not displaced past a predetermined amount, and thus indicating that the sealable bag is not properly sealed. Refer to steps S505 and S506, which explain that bag 103a is, in this case, moved to discard bin 104. As for the confirmation sensors, optical sensor 214 correctly senses the proximity of bag 103a and its LED is lit, whereas because a vacuum has not yet been directed to lifting mechanism 213, vacuum switch 250a does not yet register a vacuum and its LED remains unlit.

FIG. 6F shows extension of second gripper 240 relative to first gripper 210 and testing of second bag 103b by second gripper 240 so as to determine whether second bag 103b is properly sealed, while first bag 103a continues to be lifted by first gripper 210. Refer to steps S507 and S509. In this depiction, all four of the LED lights in the right-hand array are turned "ON" signifying a proper seal of second bag 103b. As for the confirmation sensors of the second gripper, optical sensor 244 correctly senses the proximity of bag 103b and its LED is lit, whereas because a vacuum has not yet been directed to lifting mechanism 243, vacuum switch 250b does not yet register a vacuum and its LED remains unlit.

FIG. 6G shows lifting of second bag 103b by second lifting mechanism 243 of second gripper 240. Refer to step S510. At this time, because a vacuum been directed to lifting mechanism 243 to actuate lifting mechanism 243 of the second gripper, vacuum switch 250b registers a vacuum and its LED is now lit. Optical sensor 244 continues to sense the proximity of bag 103b and its LED continues to be lit.

FIG. 7 shows an embodiment of the disclosure where multiple systems 101 for automated sorting of sealable bags 702, 703, 704 are used in tandem to sort sealable bags containing different products. In FIG. 7, at least three different products (Products X, Y, and Z) are carried in the direction of arrow "A" on different conveyors, 705, 707, 709, for automated sorted by individual systems 101. Some or all of conveyors 705, 707, 709 may or may not be "acceleration conveyors" or "waterfall conveyors" as described above. If the sealable bag 702, 703, or 704 is determined by the system 101 system to be properly sealed, the sealable bag 702, 703, or 704 is removed from the conveyer, 705, 707, or 709, respectively, and placed into a package on a different conveyor 711 which moves in the direction of arrow "B". In such a set-up, multiple sealable bags carrying different products can be simultaneously sorted and packaged into a single container for export/sale. As in other embodiments, the conveyors in this example are depicted as arranged perpendicularly with respect to each other, but in other embodiments the conveyors may be arranged differently such as in parallel.

The embodiments illustrated and discussed in this specification are intended only to teach those skilled in the art how to make and use the disclosure herein. In describing embodiments of the disclosure herein, specific terminology is employed for the sake of clarity. However, the disclosure herein is not intended to be limited to the specific terminology so selected. The above-described embodiments of the disclosure herein may be modified or varied, without departing from the disclosure herein, as appreciated by those skilled in the art in light of the above teachings. It is therefore to be understood that, within the scope of the claims and their equivalents, the disclosure herein may be practiced otherwise than as specifically described.

The invention claimed is:

1. A tool for handling of a sealable bag comprising:
a housing which includes a mount for mechanically mounting the tool to a tip end of a robot arm;
a first gripper mounted to the housing and having a first lifting mechanism actuatable to lift a sealable bag;
a second gripper mounted to the housing and having a second lifting mechanism actuatable to lift a sealable bag, wherein the second gripper is movably mounted to the housing by an extension mechanism;
each of the first and second grippers having a plurality of displaceable fingers positioned in a configuration corresponding to dimensions of the sealable bag, each displaceable finger being displaceable and having a sensor for sensing displacement of the displaceable finger by more than a predetermined amount;
a controller in communication with said sensors and the first and second lifting mechanisms,
wherein the controller is configured to retract the second gripper relative to the first gripper, to actuate the first lifting mechanism of the first gripper to lift a first sealable bag, to extend the second gripper, and to actuate the second lifting mechanism to lift a second sealable bag.

2. The tool according to claim 1, wherein the controller is further configured to determine whether the first sealable bag is sealed by reading the sensors of the first gripper to determine whether all of the plurality of displaceable fingers of the first gripper in contact with the sealable bag are displaced by more than the predetermined amount, and is further configured to actuate the first lifting mechanism responsive to a determination that all of said plurality of displaceable fingers in contact with the sealable bag are displaced by more than the predetermined amount.

3. The tool according to claim 2, wherein responsive to a determination that the first sealable bag is not sealed, the controller is further configured to provide a signal to the robot arm to move the tool to a discard station without actuating the second lifting mechanism for lifting of the second sealable bag.

4. The tool according to claim 2, wherein responsive to a determination that the first sealable bag is sealed, the controller is configured to determine whether the second sealable bag is sealed by reading the sensors of the second gripper to determine whether all of the plurality of displaceable fingers of the second gripper in contact with the sealable bag are displaced by more than the predetermined amount, and is further configured to actuate the second lifting mechanism responsive to a determination that all of said plurality of displaceable fingers in contact with the sealable bag are displaced by more than the predetermined amount.

5. The tool according to claim 4, wherein the controller is further configured to provide a signal to the robot arm to move the tool to a packaging station responsive to a determination that both of the first and second sealable bags are sealed.

6. The tool according to claim 4, wherein responsive to a determination that the first sealable bag is sealed whereas the second sealable bag is not sealed, the controller is further configured to provide a signal to the robot arm to move the tool to a discard station for discarding of the second bag, and to move to the inspection station for testing of another second bag by application of pressure thereto and for lifting of this other second bag, this process being repeated until a properly sealed second bag is obtained, after which both of the first and second bags are moved to the packaging station for release and packaging of the first and second bags.

7. The tool according to claim 1, wherein the first gripper is fixedly mounted to the housing.

8. The tool according to claim 1, wherein the first gripper is movably mounted to the housing by an extension mechanism.

9. The tool according to claim 1, wherein more than the first and second grippers are mounted to the housing, and wherein each additional gripper has a lifting mechanism actuatable to lift a sealable bag, and a plurality of displaceable fingers positioned in a configuration corresponding to dimensions of the sealable bag, each displaceable finger being displaceable and having a sensor for sensing displacement of the displaceable finger by more than a predetermined amount.

10. An automated method for sorting sealable bags comprising:
    applying pressure to a first sealable bag conveyed to an inspection station so as to determine whether the first sealable bag is sealed, wherein pressure is applied by a first gripper mounted to a housing of an end-of-arm tool mechanically mounted to a robotic arm;
    lifting the first sealable bag using a first lifting mechanism of the first gripper;
    responsive to a determination that the first sealable bag is not sealed, moving the robotic arm to a discard station while the first bag is lifted by the first lifting mechanism;
    responsive to a determination that the first sealable bag is sealed, applying pressure to a second sealable bag conveyed to the inspection station so as to determine whether the second sealable bag is sealed, wherein pressure is applied by a second gripper mounted to the housing of the end-of-arm tool; and lifting the second sealable bag using a second lifting mechanism of the second gripper.

11. The method according to claim 10, wherein responsive to a determination that both of the first and second bags are sealed, moving the robotic arm to a packaging station while the first bag is lifted by the first lifting mechanism and the second bag is lifted by the second lifting mechanism.

12. The method according to claim 10, wherein responsive to a determination that the first bag is sealed whereas the second bag is not sealed, moving the robotic arm to a discard station for discarding of the second bag, and moving the robotic arm to the inspection station for testing of another second bag by application of pressure thereto and for lifting of this other second bag, this process being repeated until a properly sealed second bag is obtained, after which both of the first and second bags are moved to the packaging station for release and packaging of the first and second bags.

13. The method according to claim 10, wherein each of the first and second grippers has a plurality of displaceable fingers positioned in a configuration corresponding to dimensions of the sealable bag, each displaceable finger being displaceable and having a sensor for sensing displacement of the displaceable finger by more than a predetermined amount;
    wherein the determination of whether the first bag is sealed comprises reading of the sensors the first gripper so as to determine whether all of said plurality of displaceable fingers of the first gripper in contact with the first sealable bag are displaced by more than the predetermined amount, and
    wherein the determination of whether the second bag is sealed comprises reading of the sensors the second gripper so as to determine whether all of said plurality of displaceable fingers of the second in contact with the second sealable bag are displaced by more than the predetermined amount.

14. The method according to claim 10, further comprising retracting the second gripper relative to the first gripper prior to said step of applying pressure to the first sealable bag by the first gripper.

15. The method according to claim 14, further comprising extending the second gripper after said step of lifting the first sealable bag by the first lifting mechanism of the first gripper.

16. A conveyor assembly comprising:
    multiple conveyors including upstream conveyors and downstream conveyors, each being controllable and constructed to convey goods to an inspection station,
    wherein downstream conveyors move more quickly than upstream conveyors, and
    wherein upstream conveyors are controlled to stop conveyance responsive to detection of unhandled goods in a downstream conveyor, the upstream conveyors being controlled to stop after continuing motion momentarily such that goods on the upstream conveyor are positioned at the lip of an advance point of the upstream conveyor onto the downstream conveyor.

17. The conveyor assembly according to claim 16, wherein each of the multiple conveyors is positioned end-to-end in roughly the same horizontal plane, such that goods are transferred from one conveyor to the next with an accompanying acceleration in speed.

18. The conveyor assembly according to claim 16, where each of the multiple conveyors is positioned in a different horizontal plane such that each upstream conveyor is elevated relative to a downstream conveyor, and such that goods drop from one conveyor to the next and are accelerated in speed.

19. The conveyor assembly according to claim 16, wherein each subsequent downstream conveyor moves at an extra multiple of speed of the immediate upstream conveyor, such that given speed "X" for a most upstream conveyor, a first downstream conveyor moves at speed 2X and a second downstream conveyor moves at speed 3X.

20. The conveyor assembly according to claim 16, further comprising a detector provided for at least one of the multiple conveyors adjacent the advance point of said one of the multiple conveyors, and constructed to detect goods as they arrive at the advance point.

21. The conveyor assembly according to claim 20, wherein the detector comprises a photosensor/photodetector pair arranged to sight across the advance point.

22. The conveyor assembly according to claim 16, wherein a stopped upstream conveyor is controlled to re-start responsive to detection that the previously unhandled good on the downstream conveyor has been handled.

23. The conveyor assembly according to claim 16, wherein a stopped upstream conveyor is controlled to re-start responsive to re-start of the immediately downstream conveyor.

* * * * *